(12) United States Patent
Darolles et al.

(10) Patent No.: US 12,255,305 B2
(45) Date of Patent: Mar. 18, 2025

(54) ATOMIC LAYER DEPOSITION ON HIGH-ASPECT-RATIO ELECTRODE STRUCTURES

(71) Applicants: CALIFORNIA INSTITUTE OF TECHNOLOGY, Pasadena, CA (US); SIENZA ENERGY INC., Pasadena, CA (US)

(72) Inventors: Isabelle M. Darolles, Altadena, CA (US); Azin Fahimi, Pasadena, CA (US); Sean A. Mendoza, Alhambra, CA (US); Shannon C. Santana, San Marino, CA (US); Zarui S. Chikneyan, Altadena, CA (US); Jeffrey L. Arias, Downey, CA (US)

(73) Assignees: CALIFORNIA INSTITUTE OF TECHNOLOGY, Pasadena, CA (US); SIENZA ENERGY INC., Pasadena, CA (US)

(*) Notice: Subject to any disclaimer, the term of this patent is extended or adjusted under 35 U.S.C. 154(b) by 630 days.

(21) Appl. No.: 17/499,181

(22) Filed: Oct. 12, 2021

(65) Prior Publication Data

US 2022/0140307 A1      May 5, 2022

Related U.S. Application Data

(63) Continuation of application No. PCT/US2020/028309, filed on Apr. 15, 2020.
(Continued)

(51) Int. Cl.
*H01M 4/04* (2006.01)
*H01M 4/36* (2006.01)
(Continued)

(52) U.S. Cl.
CPC ......... *H01M 4/0428* (2013.01); *H01M 4/366* (2013.01); *H01M 4/505* (2013.01);
(Continued)

(58) Field of Classification Search
CPC .... H01M 4/0428; H01M 4/366; H01M 4/505; H01M 4/525; H01M 4/583; H01M 4/13;
(Continued)

(56) References Cited

U.S. PATENT DOCUMENTS 7,582,544 B2   9/2009   Gunji et al.
8,951,444 B2 * 2/2015   Gordon ................. B82Y 10/00
                                                977/842
(Continued)

FOREIGN PATENT DOCUMENTS

WO   WO 2002/074842 A1   9/2002
WO   WO 2019/006297 A1   1/2019

OTHER PUBLICATIONS

Zhang et al., "An elastic germanium-carbon nanotubes-copper foam monolith as an anode for rechargeable lithium batteries," 2013, RSC Advances, 3, 1336-1340. (Year: 2013).*
(Continued)

*Primary Examiner* — Matthew W Van Oudenaren
(74) *Attorney, Agent, or Firm* — ONE LLP

(57) ABSTRACT

Battery electrodes using VACNT forests to create 3D electrode nanostructures, and methods of making, are described. The VACNTs are electrically and mechanically attached to the anode or cathode substrates, providing a large area of 3D surfaces for coating with active materials and high-conductivity electron pathways to the cell current collectors. A number of different active materials suitable for anodes and cathodes in lithium-ion batteries may be used to coat the individual carbon nanotubes. The high surface area provided by the VACNT forest and the nano-dimensions of the coated (Continued)

active materials enable both high energy-density and high power-density to be achieved with the same battery. Complete conformal coating of the individual CNTs may be achieved by a number of different methods, and coating with multiple active materials may be used to create nanolaminate coatings having improved electrochemical characteristics over single materials.

16 Claims, 29 Drawing Sheets

Related U.S. Application Data

(60) Provisional application No. 62/957,474, filed on Jan. 6, 2020, provisional application No. 62/835,308, filed on Apr. 17, 2019, provisional application No. 62/835,344, filed on Apr. 17, 2019.

(51) Int. Cl.
| | |
|---|---|
| *H01M 4/505* | (2010.01) |
| *H01M 4/525* | (2010.01) |
| *H01M 4/583* | (2010.01) |
| *H01M 4/62* | (2006.01) |
| *H01M 4/66* | (2006.01) |
| *H01M 4/80* | (2006.01) |

(52) U.S. Cl.
CPC ........... *H01M 4/525* (2013.01); *H01M 4/583* (2013.01); *H01M 4/0404* (2013.01); *H01M 4/625* (2013.01); *H01M 4/663* (2013.01); *H01M 4/808* (2013.01)

(58) Field of Classification Search
CPC .... H01M 4/625; H01M 4/0404; H01M 4/139; H01M 4/74; H01M 4/78; H01M 4/808; H01M 4/131; H01M 4/136; H01M 4/663; H01M 4/483; H01M 4/0421; H01M 4/133; H01M 4/134; H01M 4/1393; H01M 4/1395; H01M 4/386; H01M 4/387; H01M 4/587; H01M 4/667; H01M 4/72; H01M 4/742; H01M 4/745; H01M 2004/021; H01M 2004/027; H01M 10/052; H01M 10/0525
See application file for complete search history.

(56) References Cited

U.S. PATENT DOCUMENTS

| | | | |
|---|---|---|---|
| 10,516,166 B2 | 12/2019 | Fu et al. | |
| 2004/0123980 A1 | 7/2004 | Queheillalt et al. | |
| 2008/0010796 A1* | 1/2008 | Pan ....................... | H01G 11/26 29/25.03 |
| 2011/0183206 A1* | 7/2011 | Davis .................. | H01M 10/052 29/623.5 |
| 2014/0057164 A1 | 2/2014 | Brambilla et al. | |
| 2014/0126112 A1 | 5/2014 | Nguyen et al. | |
| 2014/0322608 A1 | 10/2014 | Claussen et al. | |
| 2015/0010788 A1 | 1/2015 | Aria et al. | |
| 2015/0091134 A1 | 4/2015 | Amaratunga et al. | |
| 2017/0108462 A1 | 4/2017 | Chen et al. | |
| 2018/0219223 A1* | 8/2018 | Rojeski ................ | H01M 4/131 |
| 2018/0319664 A1 | 11/2018 | Fu et al. | |

OTHER PUBLICATIONS

Welna et al., "Vertically aligned carbon nanotube electrodes for lithium-ion batteries," 2011, Journal of Power Sources, 196, 1455-1460. (Year: 2011).*
WO, PCT/US2020/028309 ISR and Written Opinion, Oct. 6, 2020.
Donders, M.E., et al., "Remote Plasma Atomic Layer Deposition of Thin Films of Electrochemically Active $LiCoO_2$", ECS Transactions, 2011, vol. 41, No. 2, pp. 321-330.
Forney, M. W., et al., "High performance silicon free-standing anodes fabricated by low pressure and plasma-enhanced chemical vapor deposition onto carbon nanotube electrodes", J. Power Sources, vol. 228, pp. 270-280.
Guan, C., et al., "Iron Oxide-Decorated Carbon for Supercapacitor Anodes with Ultrahigh Energy Density and Outstanding Cycling Stability", ACS Nano, 2015, vol. 9, Np. 5, pp. 5198-5207.
Guan, C., et al., "Recent Development of Advanced Electrode Materials by Atomic Layer Deposition for Electrochemical Energy Storage", Advanced Science, 2016, vol. 3, pp. 1-23.
Haag, J. M., et al., "Nanostructured 3D Electrode Architectures for High-Rate Li-Ion Batteries", Advanced Materials, 2013, pp. 1-6.
Hagen, M., et al. "Lithium-sulphur batteries—binder free carbon nanotubes electrode examined with various electrolytes", J. Power Sources, 2012, vol. 213, pp. 239-248.
Miikkulainen, V. et al., "Atomic Layer Deposition of Spinel Lithium Manganese Oxide by Film-Body-Controlled Lithium Incorporation for Thin-Film Lithium-Ion Batteries", J. Phys. Chem. C, 2014, vol. 118, pp. 1258-1268.
Ming, H., "Gradient $V_2O_5$ surface-coated $LiMn_2O_4$ cathode towards enhanced performance in Li-ion battery applications", Electrochimica Acta, 2014, vol. 120, pp. 390-397.
Van Hooijdonk, E., et al., "Functionalization of vertically aligned carbon nanotubes", Beilstein Journal of Nanotechnology, 2013, vol. 4, pp. 129-152.
Zhao, N., et al., "Direct Growth of Carbon Nanotubes on Metal Supports by Chemical Vapor Deposition", Carbon Nanotubes—Synthesis, Characterization, Applications, Dr. Siva Yellampalli (Ed.), 2011, Chapter 6, pp. 99-120.
EP, 20791549.7 Examination Report, Oct. 2, 2023.
Brieland-Shoultz, A., et al., "Scaling the Stiffness, Strength, and Toughness of Ceramic-Coated Nanotube Foams into the Structural Regime", Advanced Functional Materials, 2014, vol. 24, No. 36, pp. 5728-5735.
CN, 202080044350.1 First Office Action.
Xie, M., et al., "Amorphous Ultrathin $TiO_2$ Atomic Layer Deposition Films on Carbon Nanotubes as Anodes for Lithium Ion Batteries", Journal of The Electrochemical Society, 2015, vol. 162, No. 6, pp. A974-A981.

* cited by examiner

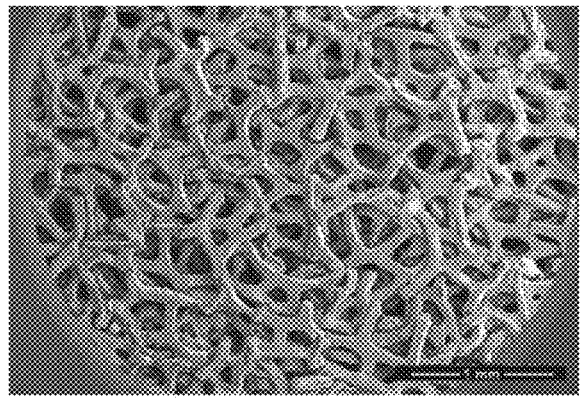
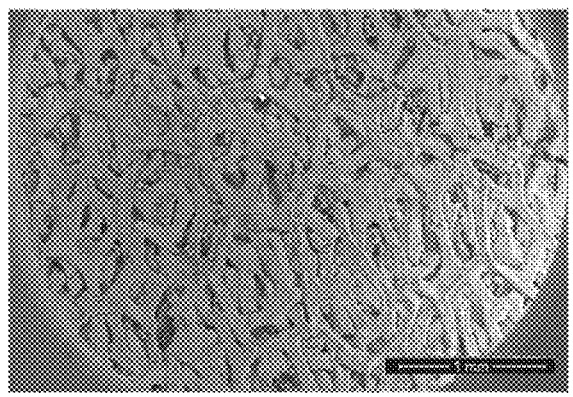
FIG. 6A                    FIG. 6B
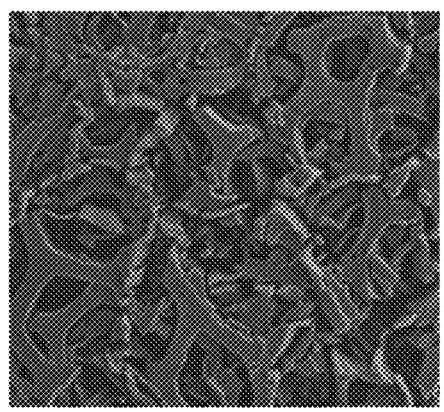
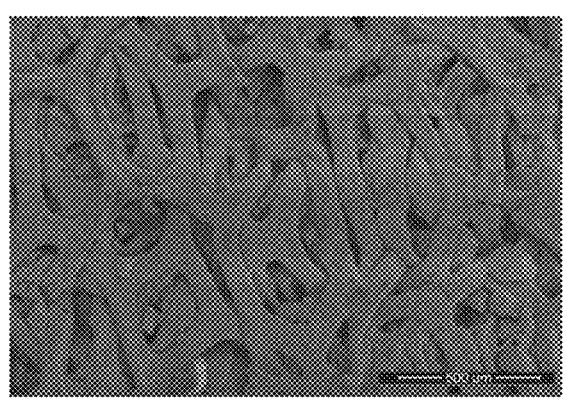
FIG. 7A                    FIG. 7B

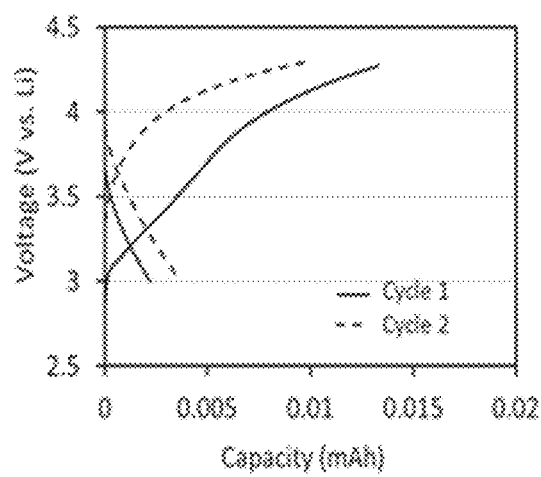 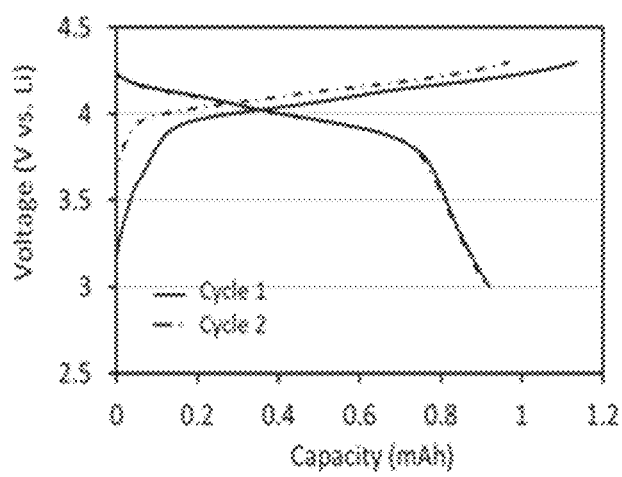
FIG. 12A FIG. 12B

ATOMIC LAYER DEPOSITION ON HIGH-ASPECT-RATIO ELECTRODE STRUCTURES

CROSS-REFERENCE TO RELATED APPLICATIONS

This application is a continuation of International Application No. PCT/US20/28309, filed Apr. 15, 2020, which claims the benefit of priority under 35 U.S.C. § 119(e) from U.S. Provisional Application Ser. No. 62/835,308, filed Apr. 17, 2019, U.S. Provisional Application Ser. No. 62/835,344, filed Apr. 17, 2019, and U.S. Provisional Application Ser. No. 62/957,474, filed Jan. 6, 2020, all of which are hereby incorporated by reference in their entirety for all purposes.

FIELD OF THE INVENTION

The invention relates to lithium ion batteries with electrodes that include vertically aligned carbon nanotubes and methods for coating active materials on the electrodes.

BACKGROUND

A lithium ion battery includes at least one anode, at least one cathode, and at least one separator, which are all contained in a housing or casing. The anodes, cathodes, and separators may be stacked, alternatively, the anodes, cathodes, and separators may be sheets that are rolled or folded together. An electrolyte fills the container and fills the space between the cathode and anode. A lithium ion battery generates electricity through oxidation and reduction reactions. Lithium ions are extracted from the cathode and inserted into the anode during the charge process and the reverse reaction occurs during the discharge process. In conventional lithium ion cells, each of the anode and cathode are composed of an active material, conductive agent, binder, and a current collector. Electrons between the active material and the current collector can only be transferred through the conductive agents, which can result in poor energy storage performance in conventional anodes and cathodes.

Vertically-aligned carbon nanotubes (VACNT) have unique electrical and mechanical properties ideal for use as current collectors and enable 3D electrodes to be constructed for Lithium-ion batteries. It is possible to grow VACNTs up several millimeters tall on substrates, which enables high areal loading (mg/cm$^2$) of active material without compromising the electrical conductivity within the electrode. A high areal loading results in a high areal capacity (mAh/cm$^2$), which is essential for producing batteries with superior energy density (Wh/L or Wh/kg) to those now in the marketplace.

While it is recognized that 3D electrode structures such as VACNTs on planar substrates offer the potential for improving both energy density (Wh/L) and power density (W/L) of batteries, a thorough and uniform coating of the structures with active materials is required. This can be problematic if the aspect ratio (e.g., the height of the carbon nanotubes (CNTs) divided by the space between them) is very high. The methods of coating that can be employed are Atomic Layer Deposition (ALD), Chemical Vapor Deposition (CVD), precipitation, melting, or sol gel. All require thorough penetration for the full depth of the structure "forest." High aspect ratio forests can require long ALD deposition times or multiple sol-gel coatings, both of which increase manufacturing cost. If the aspect ratio can be kept low, however, both ALD and sol-gel coatings can be applied more quickly and uniformly. Low aspect ratios, however, are accompanied by lower electrode loadings (mg/cm$^2$) of active materials, resulting in reduced energy densities of a battery.

A thorough and uniform coating of the structures with active materials is required. Although VACNTs offer high surface area, they are also tightly packed, which makes the incorporation of the active material very difficult. Dry processes such as PVD and CVD that deposit active materials are not suitable because the precursors cannot penetrate inside the VACNT forest due to the very high aspect ratio (e.g., the height of the CNTs divided by the space between them). Wet processes, such as sol-gel and hydrothermal methods, use harsh conditions that can damage the VACNT, especially for synthesis of cathode materials. The use of solvents also can affect the mechanical stability and the shape of the VACNT forest, which can be problematic. ALD is considered one deposition method with great potential for producing very thin, conformal films with control of the thickness and composition of the films possible at the atomic level. Simple materials such as $Al_2O_3$ and $TiO_2$ have been deposited successfully by ALD and demonstrated as the best protective layer to improve cycle life of electrode active materials. Some researchers have demonstrated the deposition of thin layers of active materials for lithium ion batteries such as $LiMn_2O_4$ and $LiCoO_2$ but on flat substrates. Traditional ALD methods, however, may result in incomplete or non-uniform coatings of the VACNTs.

Therefore, anodes and cathodes containing VACNTs and methods for coating the VACNTs with active materials and protective layers are needed to overcome the shortcomings described above.

SUMMARY

Battery electrodes using VACNT forests to create 3D electrode nanostructures, and methods of making, are described. The VACNTs are electrically and mechanically attached to the anode or cathode substrates, providing a large area of 3D surfaces for coating with active materials and high-conductivity electron pathways to the cell current collectors. A number of different active materials suitable for anodes and cathodes in lithium-ion batteries may be used to coat the individual carbon nanotubes. The high surface area provided by the VACNT forest and the nano-dimensions of the coated active materials enable both high energy-density and high power-density to be achieved with the same battery. Complete conformal coating of the individual CNTs may be achieved by a number of different methods, and coating with multiple active materials may be used to create nanolaminate coatings having improved electrochemical characteristics over single materials.

The development of an ALD recipe for these materials on high aspect ratio structures is essential to achieve high loading VACNTs electrodes. ALD has been identified as the key method to enable high loading of active material onto VACNTs and high cycle life. A method of electrode fabrication using ALD technique in conjunction with high aspect ratio VACNT 3D current collector is described.

In one embodiment, a lithium ion battery is described. The battery includes an anode comprising a first conductive substrate (e.g., a planar conductive substrate such as a metal foil), a first plurality of vertically aligned carbon nanotubes, and a first active material layer located on an outer surface of each nanotube of the first plurality of vertically aligned carbon nanotubes, wherein each of the first plurality of vertically aligned carbon nanotubes has a longitudinal axis that is substantially perpendicular to a longitudinal axis of the first substrate; and a cathode comprising a second conductive substrate, a second plurality of vertically aligned carbon nanotubes, and a second active material layer located on an outer surface of each nanotube of the second plurality of vertically aligned carbon nanotubes, wherein each of the second plurality of vertically aligned carbon nanotubes has a longitudinal axis that is substantially perpendicular to a longitudinal axis of the second substrate.

In another embodiment, a lithium ion battery is described. The battery includes an anode comprising a first compressible foam substrate comprising a first plurality of metal ligaments connecting to form a plurality of open pores, a first plurality of vertically aligned carbon nanotubes, and a first active material layer, wherein each nanotube of the first plurality of vertically aligned carbon nanotubes has an outer surface, a first end, and a longitudinal axis, wherein the first active material layer is located on the outer surface of each nanotube of the first plurality, and wherein the first end of each nanotube of the first plurality is connected to a metal ligament of the first plurality of metal ligaments and the longitudinal axis of each of the nanotubes is substantially perpendicular to a longitudinal axis of the first compressible foam substrate; and a cathode comprising a second compressible foam substrate comprising a second plurality of metal ligaments connecting to form a plurality of open pores, a second plurality of vertically aligned carbon nanotubes, and a second active material layer, wherein each nanotube of the second plurality of vertically aligned carbon nanotubes has an outer surface, a first end, and a longitudinal axis, wherein the second active material layer is located on the outer surface of each nanotube of the first plurality, and wherein the first end of each nanotube of the second plurality is connected to a metal ligament of the second plurality of metal ligaments and the longitudinal axis of each of the nanotubes is substantially perpendicular to a longitudinal axis of the second compressible foam substrate.

In another embodiment, an anode of a lithium ion battery is described. The anode includes a substrate; a current collector comprising a plurality of vertically aligned carbon nanotubes, wherein each of the nanotubes in the plurality of vertically aligned carbon nanotubes has an outer surface and a first end, wherein the first end is coupled to the substrate; and an active material layer located on the outer surface of each of the nanotubes in the plurality of vertically aligned carbon nanotubes.

In another embodiment, a cathode of a lithium ion battery is described. The cathode includes a substrate; a current collector comprising a plurality of vertically aligned carbon nanotubes, wherein each of the nanotubes in the plurality of vertically aligned carbon nanotubes has an outer surface and a first end, wherein the first end is coupled to the substrate; and at least one active material layer located on the outer surface of each of the nanotubes in the plurality of vertically aligned carbon nanotubes.

In another embodiment, a method of making an anode for a lithium ion battery is described. The method includes the step of depositing a catalyst and an underlayer on a substrate (on one or both sides of the substrate), the substrate having a longitudinal axis. A plurality of vertically aligned carbon nanotubes is then grown on the substrate (on one or both sides of the substrate), wherein each nanotube of the plurality of vertically aligned carbon nanotubes has an outer surface and a longitudinal axis, and wherein the longitudinal axis of each nanotube is substantially perpendicular to the longitudinal axis of the metal foil substrate. A protective layer is then deposited on the outer surface of each nanotube by atomic layer deposition.

In another embodiment, a method of making a cathode for a lithium ion battery is described. The method includes the step of depositing a catalyst and an underlayer on a substrate (on one or both sides of the substrate), the substrate having a longitudinal axis. A plurality of vertically aligned carbon nanotubes is grown on the substrate (on one or both sides of the substrate), wherein each nanotube of the plurality of vertically aligned carbon nanotubes has an outer surface and a longitudinal axis, and wherein the longitudinal axis of each nanotube is substantially perpendicular to the longitudinal axis of the substrate. A protective layer is deposited on the outer surface of each nanotube by atomic layer deposition.

In any of the embodiments described herein, a substrate may comprise at least one hole, void, or gap. The holes, voids, or gaps may define an area of between about 10 $\mu m^2$ and about 500 $\mu m^2$, alternatively between about 25 $\mu m^2$ and about 400 $\mu m^2$, alternatively between about 10 $\mu m^2$ and about 250 $\mu m^2$, alternatively between about 10 $\mu m^2$ and about 300 $\mu m^2$. The distance between the holes, voids, or gaps may be between about 5 $\mu m$ and about 150 $\mu m$, alternatively between about 5 $\mu m$ and about 100 $\mu m$, alternatively between about 25 $\mu m$ and about 100 $\mu m$, alternatively between about 50 $\mu m$ and about 100 $\mu m$. A substrate may also be patterned, such as a mesh, screen, or foil. The substrate may be patterned using shadow mask, photolithography, electron-beam (e-beam) lithography, and etching. For example, in a trench pattern, the stripes may have a width between about 5 $\mu m$ and about 150 $\mu m$, alternatively between about 5 $\mu m$ and about 100 $\mu m$, alternatively between about 25 $\mu m$ and about 100 $\mu m$. The gaps in the trench pattern may have a width between about 5 $\mu m$ and about 50 $\mu m$, alternatively between about 5 $\mu m$ and about 20 $\mu m$, alternatively between about 10 $\mu m$ and about 30 $\mu m$. In the street pattern, the squares may have areas between about 1600 $\mu m^2$ and about 10,000 $\mu m^2$, alternatively between about 1000 $\mu m^2$ and about 10,000 $\mu m^2$, alternatively between about 1500 $\mu m'$ and about 8,000 $\mu m^2$. The spacing or distance between the squares may be between about 5 $\mu m$ and about 10 $\mu m$, alternatively between about 2.5 $\mu m$ and about 10 $\mu m$, alternatively between about 2.5 $\mu m$ and about 8 $\mu m$.

In any of the embodiments described herein, the substrate may also be a compressible foam, e.g., made from copper, nickel, stainless steel, aluminum alloy, nickel alloy, carbon, graphene, and graphite. The compressible foam may comprise a plurality of metal ligaments that connect to form a plurality of openings, open pores, or open cells. The open pore count may be about 40 ppi to about 100 ppi, alternatively about 50 ppi to about 100 ppi, alternatively about 60 ppi to about 100 ppi, alternatively about 40 ppi to about 95 ppi, where PPI is pores per inch. Alternatively, the open pore count may be >about 40 ppi, alternatively >about 50 ppi, alternatively >about 60 ppi, alternatively >about 70 ppi, alternatively >about 80 ppi, alternatively >about 90 ppi, alternatively >about 100 ppi, alternatively >about 110 ppi, where PPI is pores per inch. The compressible foam may have a porosity or void volume of between about 70 to about 98%, alternatively from about 75 to about 98%, alternatively from about 75 to about 96%, alternatively from about 70 to about 99%, alternatively from about 80 to about 97%. The metal ligaments forming the compressible foam may have a width of about 10 $\mu m$ to about 100 $\mu m$, alternatively about 10 $\mu m$ to about 95 $\mu m$, alternatively about 10 $\mu m$ to about 90 $\mu m$, alternatively about 15 $\mu m$ to about 100 $\mu m$, alternatively about 15 μm to about 95 μm, alternatively about 15 μm to about 90 μm, alternatively about 15 μm to about 85 μm. The compressibility of the foam may be greater than about 30%, alternatively greater than about 40%, alternatively greater than about 60%, alternatively between about 30% and about 80%, alternatively between about 40% and about 80%, alternatively between about 50% and about 80%, alternatively between about 30% and about 90%, alternatively between about 40% and about 90%, alternatively between about 50% and about 90%. The compressibility of the foam is defined according to the following formula:

$$\frac{\text{Thickness of foam before compression} - \text{Thickness of foam after compression}}{\text{Thickness of foam before compression}} \times 100 \qquad (1)$$

In any of the embodiments described herein, the VACNTs have a first end that is connected to or coupled to a substrate. The VACNTs have a longitudinal axis that is substantially perpendicular to a longitudinal axis of the substrate to which they are attached.

In any of the embodiments described herein, the aspect ratio of the plurality of vertically aligned carbon nanotubes can be between about 100 and about 3000, alternatively between about 100 and about 2500, alternatively between about 100 and about 2000, alternatively between about 100 and about 1500, alternatively between about 100 and about 1000.

In any of the embodiments described herein, the active material layers may comprise $FePO_4$, $Li_xMn_2O_4$ and $Li_xV_2O_5$, $LiCoO_2$, $V_2O_5$, $Co_3O_4$, $RuO_2$, $SnO_2$, $TiO_2$, $Cu_2S$, $SiO_x$, and combinations thereof. An anode active material layer may comprise $SnO_2$, $SiO_x$, $RuO_2$, $TiO_2$, $Cu_2S$, and combinations thereof. A cathode active material layer may comprise $Li_xV_2O_5$, $V_2O_5$, $LiNiO_2$, $LiMn_2O_4$, $LiCoO_2$, $FePO_4$, $LiFePO_4$, $Li(Mn,Ni,Co)O_2$, $Li(Ni,Co,Al)O_2$, and combinations thereof. The anode and cathode may each have a single layer of one active material or may have two, alternatively three, alternatively four, alternatively five, alternatively six, alternatively seven layers of different or alternating active materials and/or protective layers.

In any of the embodiments described herein, the surfaces of the VACNTs may be functionalized to increase the number of precursor nucleation sites. The surfaces may be functionalized using acid functionalization, oxygen plasma treatment, chemical functionalization, or by application of an adhesion layer.

In any of the embodiments described herein, the volumetric energy density of a battery cell may be at least about 1,200 Wh/L, alternatively between about 600 to about 1600 Wh/L, alternatively between about 800 to about 1600 Wh/L. Batteries with volumetric densities between about 600 to about 800 Wh/L can be used in battery-powered electric vehicles. Batteries with volumetric densities between about 20 and about 800 Wh/L can be used for other applications requiring more power and less energy.

In any of the embodiments described herein, the specific energy density or gravimetric energy density of a battery cell may be at least about 10 Wh/kg, alternatively at least about 500 Wh/kg, alternatively between about 250 Wh/kg and about 600 Wh/kg, alternatively between about 500 and about 600 Wh/kg, alternatively between about 550 and about 650 Wh/kg.

BRIEF DESCRIPTION OF THE DRAWINGS

FIGS. 6A and 6B are SEM images of a foam substrate containing VACNTS before and after compression, respectively.

FIGS. 7A and 7B are SEM images of a foam substrate containing VACNTS before and after compression, respectively.

FIGS. 12A and 12B show the charge/discharge profiles of the first two cycles of and $LiMn_2O_4$-coated on VACNT by a wet method in a half cell coin cell. FIG. 12A shows the first two cycles of an uncoated VACNT. FIG. 12B shows a VACNT coated by $Al_2O_3$ by ALD prior to coating with the active material.

DETAILED DESCRIPTION

Figure 1B:
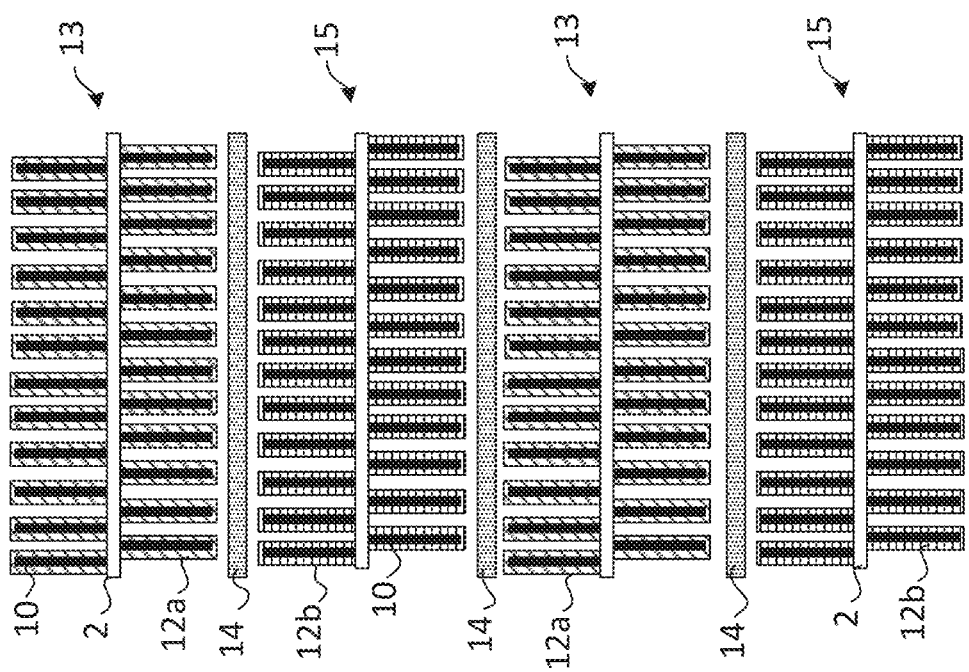
FIG. 1B is a diagram of a battery cell construction containing multiple anodes and cathodes.
Figure 1A:
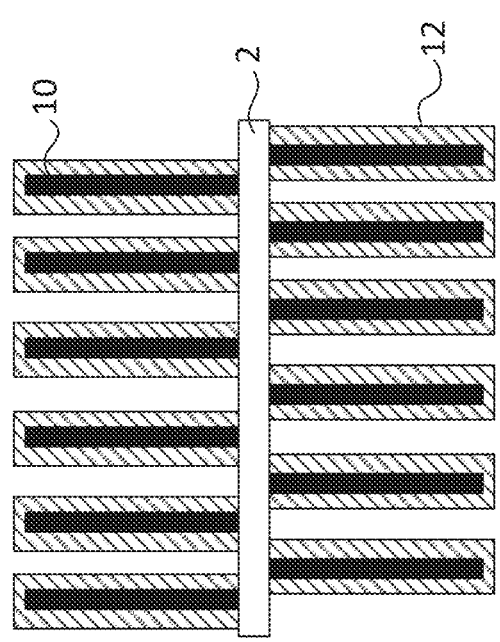
FIG. 1A is a diagram of an electrode having VACNTs on both sides of a substrate.

As seen in FIG. 1A, in a typical electrode construction, VACNTs 10 can be grown on one or both sides of a substrate 2, such as a metal foil. Active material 12 covers an outer surface of the VACNTs 10. As seen in FIG. 1B, in a typical battery cell construction, anodes 13 and cathodes 15 are separated by separators 14. As depicted, the anodes 13, cathodes 15, and separators 14 may be stacked. Alternatively, the anodes 13, cathodes 15, and separators 14 may be sheets that are rolled or folded together (not shown).

Figure 25:
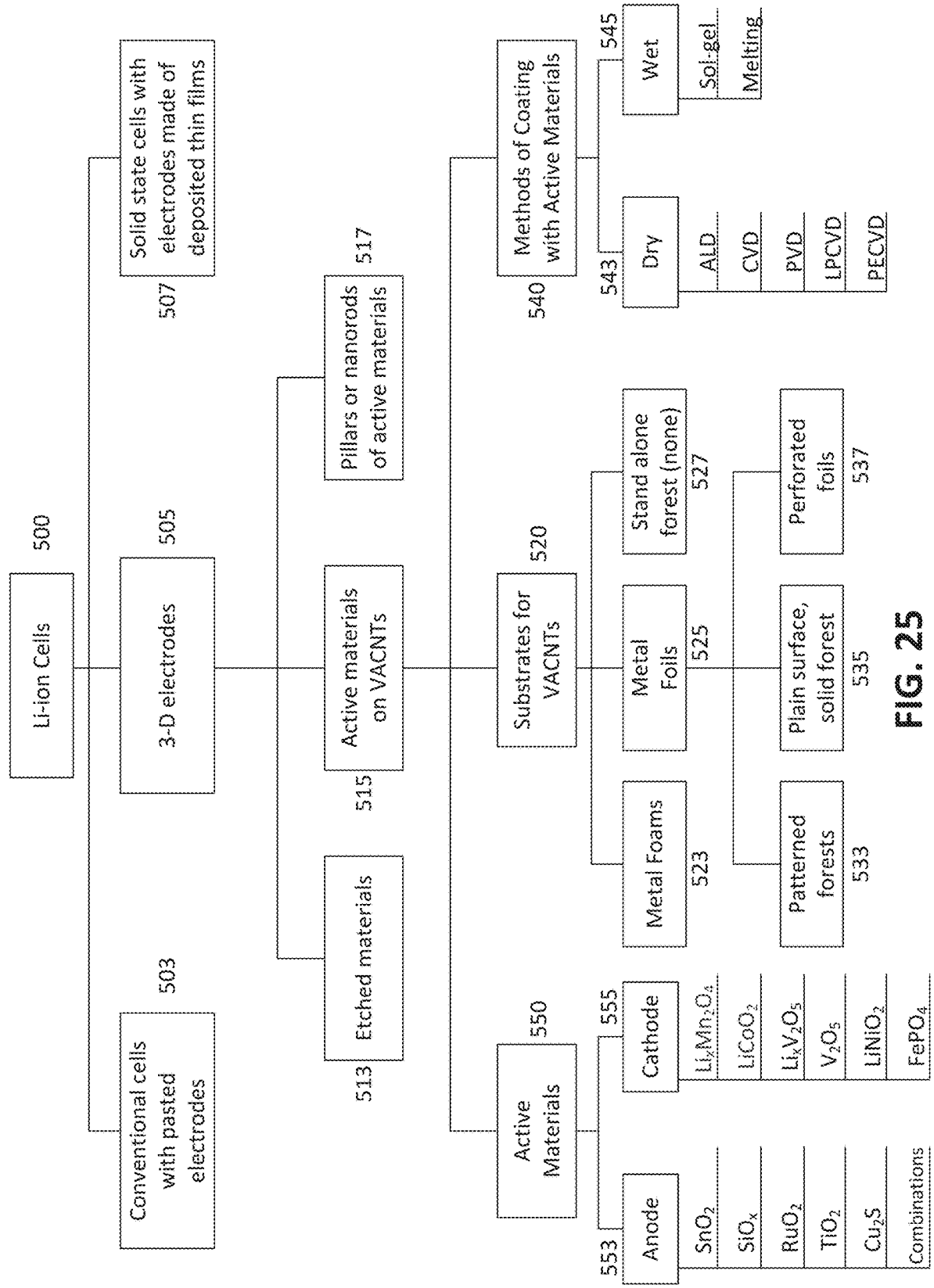
FIG. 25 summarizes various alternative constructions and methods of constructing lithium ion batteries.

FIG. 25 summarizes various materials and methods of manufacture used to make lithium ion batteries 500. The electrodes in lithium ion batteries include conventional cells with pasted electrodes 503 (e.g., active material, carbon additive, and binder), electrodes with 3-dimensional (3D) structures 505, and solid state cells with electrodes made of deposited thin films 507. The 3D electrode structures may be, but are not limited to, etched materials 513, VACNTs with active materials coated thereon 515, or pillars or nanorods of active materials 517. With regard to electrodes with VACNTs, the substrates for VACNTs 520 include metal foils 525, metal foams 523, or the VACNTs can be grown as stand-alone forests 527 (none). The metal foil substrates 525 may be patterned 533, plain and solid 535, or perforated 537. The active materials 550 for anodes 553 include but are not limited to SnO$_2$, SiO$_x$, RuO$_2$, TiO$_2$, Cu$_2$S, and combinations thereof. The active materials 550 for cathodes 555 include by are not limited to Li$_x$V$_2$O$_5$, V$_2$O$_5$, LiNiO$_2$, LiMn$_2$O$_4$, LiCoO$_2$, FePO$_4$, LiFePO$_4$, Li(Mn,Ni,Co)O$_2$, and Li(Ni,Co,Al)O$_2$. The active materials may be coated 540 using wet 545 and/or dry 543 methods. The wet methods 545 include but are not limited to sol-gel and melting. The dry methods 543 include but are not limited to Atomic Layer Deposition (ALD), CVD, PVD, LPCVD, and PECVD.

Atomic Layer Deposition

A method of coating high aspect ratio structures, such as VACNTs, through atomic-layer deposition is described herein. Methods of performing ALD are described in Miikkulainen, V. et al. "Atomic Layer Deposition of Spinel Lithium Manganese Oxide by Film-Body-Controlled Lithium Incorporation for Thin-Film Lithium-Ion Batteries." J. Phys. Chem. C 118: 1258-1268 (2014), which is hereby expressly incorporated by reference in its entirety for all purposes. The high aspect ratio of these structures (height/gap between adjacent structures) can inhibit the full-length coatings of active material because precursors cannot penetrate easily inside the dense structures.

As mentioned above, VACNTs can be used as current collectors in Lithium ion batteries. VACNTs can be grown on substrates for use as current collectors. Growth of VACNTs on supports using chemical vapor deposition (CVD) is described in Zhao, N. and Kang, J. "Direct Growth of Carbon Nanotubes on Metal Supports by Chemical Vapor Deposition." Carbon Nanotubes—Synthesis, Characterization, Applications, Dr. Siva Yellampalli (Ed.), ISBN: 978-953-307-497-9, InTech, Available from: http://www.intechopen.com/books/carbon-nanotubessynthesis-characterization-applications/direct-growth-of-carbon-nanotubes-on-metal-supports-by-chemicalvapor-deposition, which is hereby expressly incorporated by reference in its entirety for all purposes. The VACNTs can be grown to have a height of between 10 μm and about 3 mm, alternatively between about 20 μm and about 3 mm, alternatively between about 20 μm and about 2 mm, alternatively between 50 μm and about 1 mm, alternatively between about 50 μm and 800 μm, alternatively between about 100 μm and 600 μm, alternatively between about 50 μm and 500 μm, alternatively between about 20 μm and about 100 μm, alternatively between about 100 μm and 500 μm, alternatively between about 100 μm and 400 μm, alternatively between about 100 μm and 300 μm, alternatively between about 100 μm and 200 μm, alternatively between about 40 μm and about 200 μm. The VACNTs for an anode may have a height between about 20 μm and about 100 μm. The VACNTs for a cathode may have a height between about 40 μm and about 300 μm.

Figure 1C:
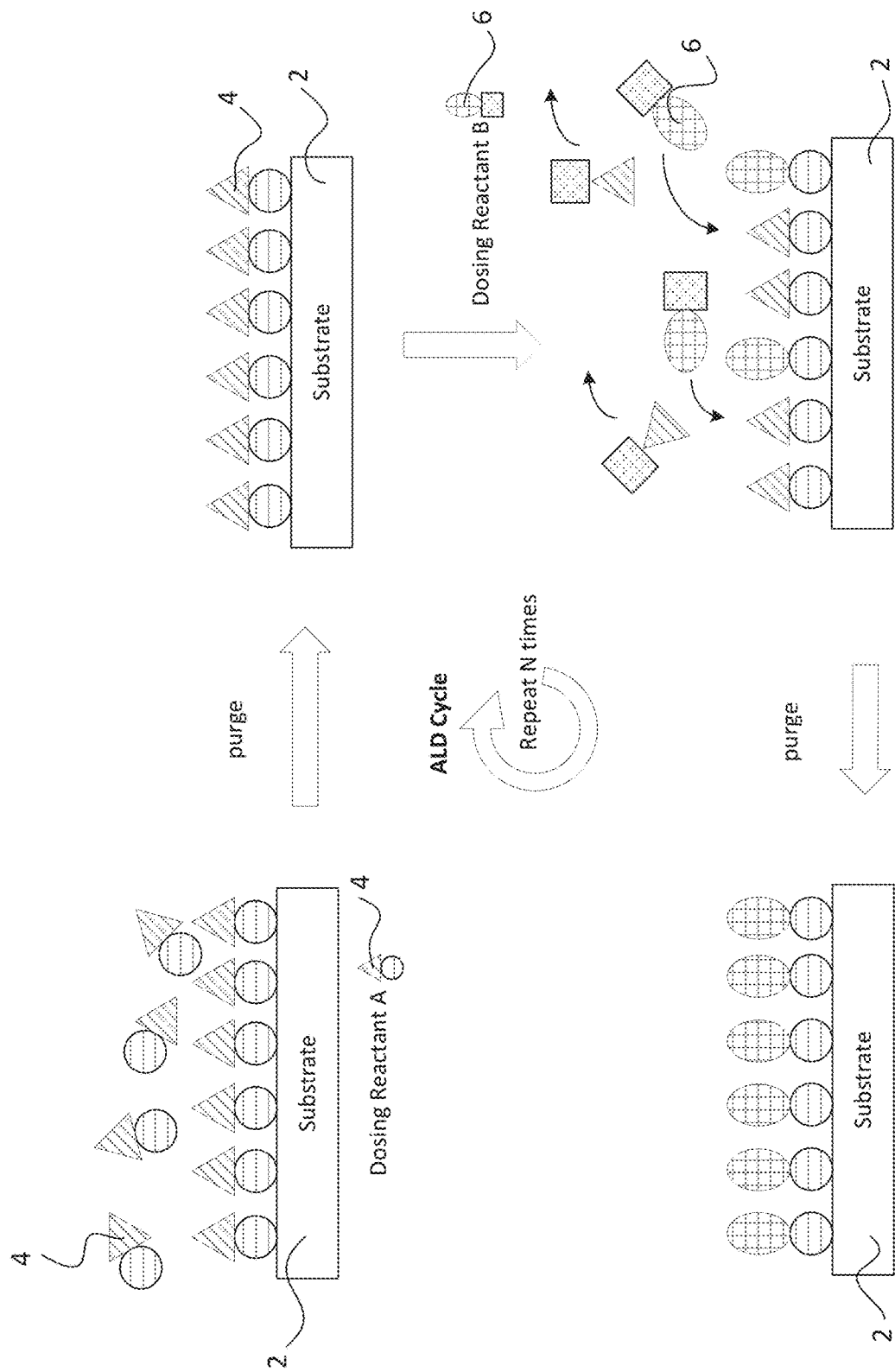
FIG. 1C is a diagram of a prototypical ALD process on a flat substrate.

As seen in FIG. 1C, in a prototypical ALD process on a flat substrate, a substrate 2 is exposed to Reactant A 4 and Reactant B 6 in a sequential, non-overlapping way. In contrast to other techniques, such as chemical vapor deposition where the reactants are introduced simultaneously and thin-film growth proceeds on a steady-state fashion, in ALD each reactant reacts with the surface in a self-limited way: the reactant molecules can react only with a finite number of reactive (active or nucleation) sites on the surface. Once all of the reactive (active or nucleation) sites have been consumed in the reactor, the growth stops. The remaining reactant molecules are flushed away before Reactant B 6 is inserted into the reactor. By alternating exposures of Reactant A 4 and Reactant B 6, a thin film is deposited. Consequently, when describing an ALD process, one refers to both dose times (the time a surface is being exposed to a precursor) and purge times (the time left in between doses for the precursor to evacuate the chamber) for each precursor/reactant. The dose-purge-dose-purge sequence of a binary ALD process constitutes an ALD cycle. Moreover, rather than using the concept of growth rate, ALD processes are typically described in terms of their growth per cycle.

Figure 1D:
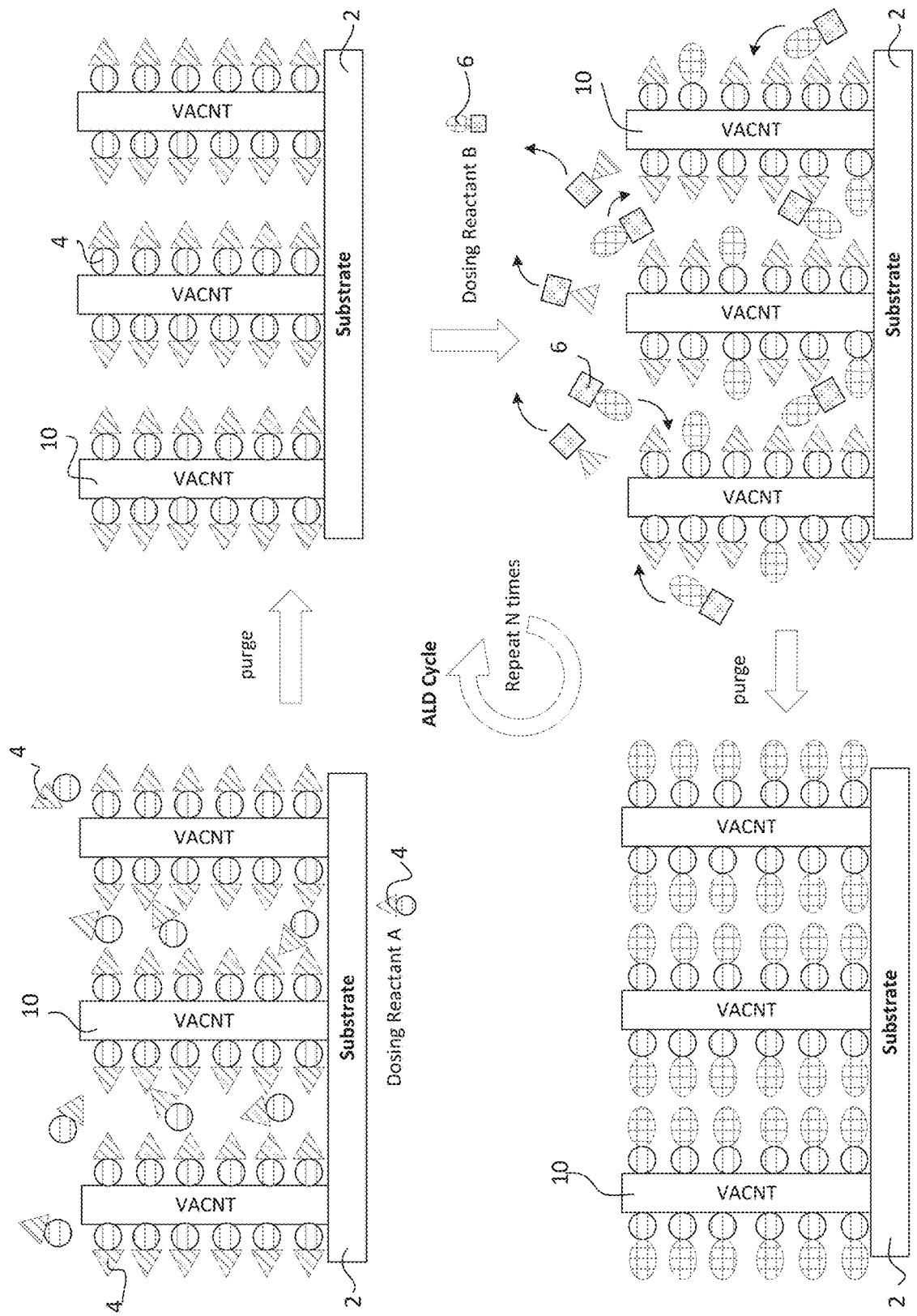
FIG. 1D is a diagram of an ALD process on VACNTs.

Using ALD to coat VACNTs 10, however, presents several problems. As depicted in FIG. 1D, the aspect ratio (e.g., the height of the carbon nanotubes (CNTs) 10 divided by the space between them) is very high. Thus, the VACNT 10 forest presents steric hindrance issues in that it may be difficult for the various reactants 4, 6 to access and react with the various active sites along the length of each VACNT 10. High aspect ratio forests can require long ALD deposition times, which increases manufacturing cost.

The aspect ratios of the VACNT forests 20 can be between about 100 and about 3000, alternatively between about 100 and about 2500, alternatively between about 100 and about 2000, alternatively between about 100 and about 1:500, alternatively between about 100 and about 1000.

Gas Diffusion

Figure 2A:
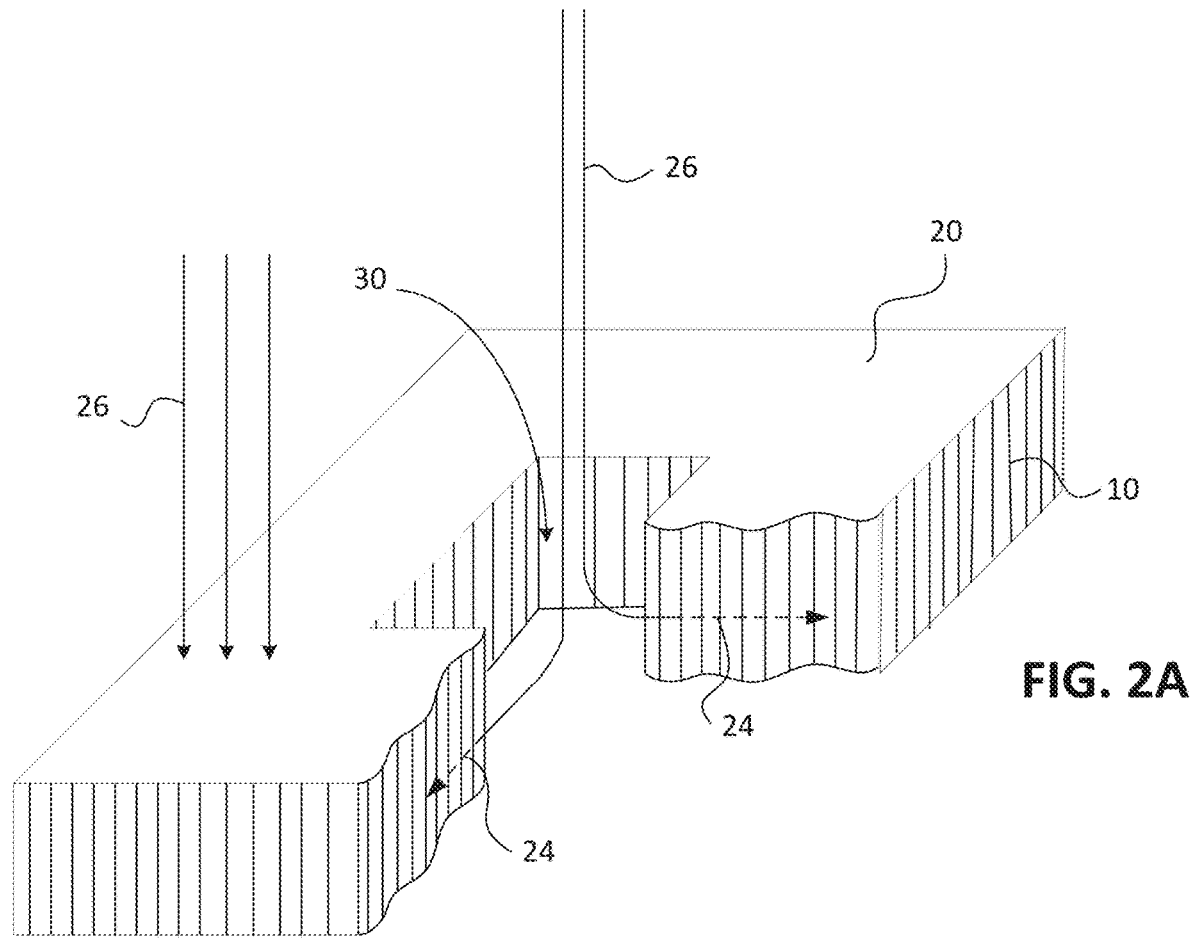
FIG. 2A depicts how empty spaces (holes, voids, or gaps) in a VACNT forest enables lateral penetration of ALD precursor gases into forest to coat CNTs.
Figure 2B:
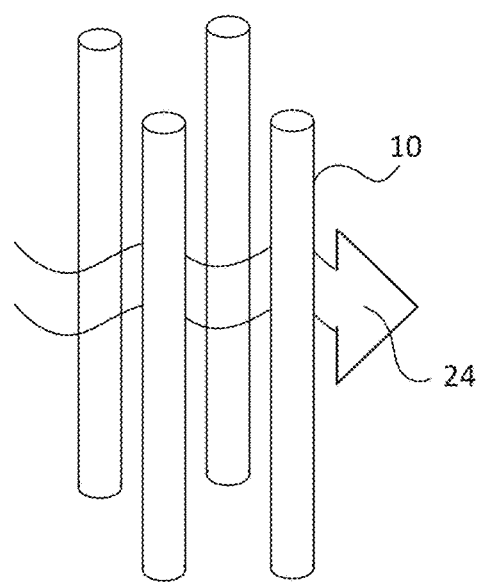
FIG. 2B depicts lateral gas diffusion through a plurality of VACNTs.
Figure 3A:
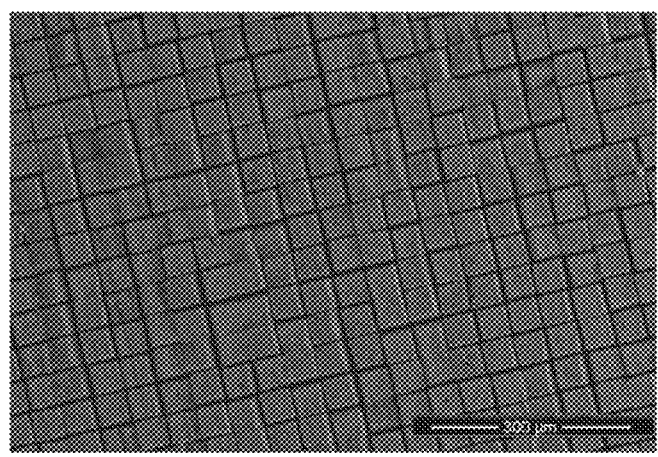
FIG. 3A is a SEM image of a VACNT forest, produced by depositing VACNTs on a substrate with a street pattern.
Figure 3B:
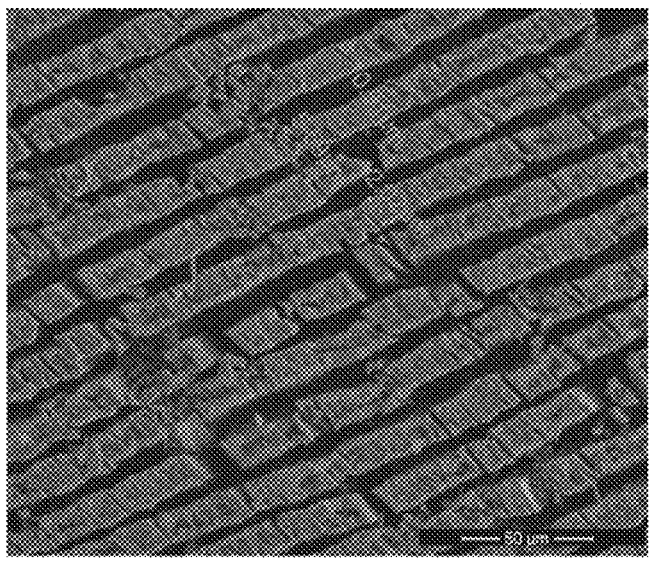
FIG. 3B is a SEM image of a VACNT forest, produced by depositing VACNTs on a substrate with a trench pattern.
Figure 3C:
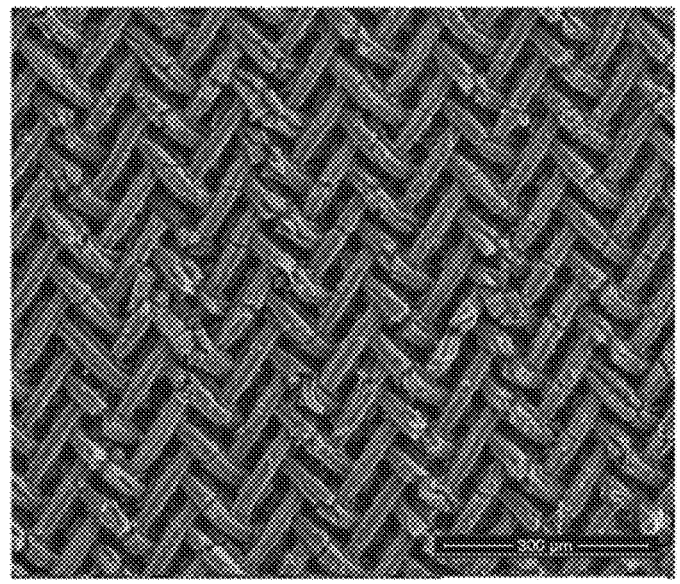
FIG. 3C is a SEM image of a VACNT forest, produced by depositing VACNTs on a mesh substrate.
Figure 3D:
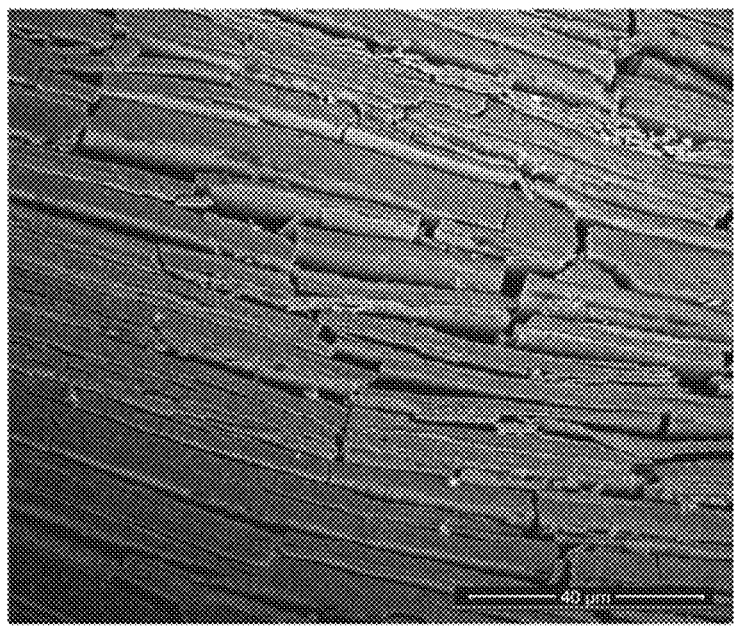
FIG. 3D is a SEM image of a VACNT forest, produced by depositing VACNTs on a natural pattern on a Cu foil.
Figure 3E:
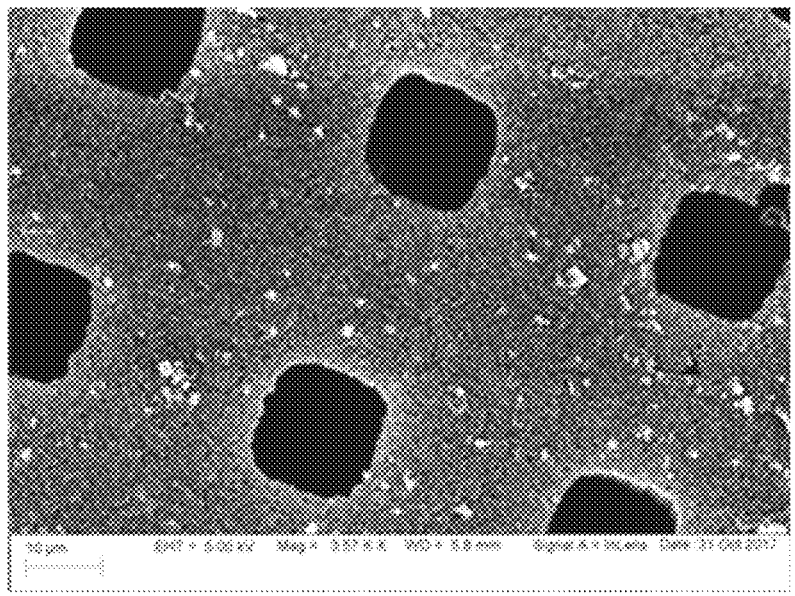
FIG. 3E is a SEM image of a VACNT forest on a solid substrate having square holes, produced by patterning the catalyst layer using photolithography

One way to improve the use of ALD to coat VACNTs is to improve the diffusion of gas through the VACNT forest 20. For example, as seen in FIG. 2A, lateral ALD gas diffusion 24 into the VACNT forest 20 could be accomplished by patterning the VACNT forest 20 on a substrate having voids, holes, or gaps 30 in the substrate that allows for gas to flow vertically 26 down and into the voids, holes, or gaps 30 and then flow laterally 24 through the VACNT forest 20. As seen in FIG. 2B, lateral ALD gas diffusion 24 would allow the gas to flow through the VACNT forest 20 at an approximately perpendicular direction to a longitudinal axis of the VACNTs 10. The VACNT-free areas (holes or voids) 30 would increase the effective perimeter of the nanotube forest 20 to provide large lateral-diffusion entry-paths. Various patterned substrates having empty spaces within the VACNT forest will thus assist in increasing gas diffusion during ALD. Patterning VACNTs can be done by: (1) using a patterned substrate (see, e.g., FIG. 3A and FIG. 3B), such as a mesh (see, e.g., FIG. 3C), or screen, foil (see, e.g., FIG. 3D), or a perforated foil, to restrict the VACNT forest area; (2) patterning the catalyst using photo-lithography (see, e.g., FIG. 3E), e-beam-lithography, etching, or shadow mask; or (3) selectively removing areas on a VACNT layer, such as with laser ablation. FIG. 3A is a SEM (Scanning Electron Microscope) image of a VACNT forest, which was produced by depositing VACNTs on a substrate with a street, square, or cubic pattern. FIG. 3B is a SEM image of a VACNT forest, which was produced by depositing VACNTs on a substrate with a trench pattern. The solid surfaces have a width of between about 10 µm and about 13 µm, and are separated by gaps of approximately 5 µm to about 10 µm. FIG. 3C is a SEM image of approximately 50 µm gaps in a VACNT forest, which was produced by depositing VACNTs on a mesh substrate. FIG. 3D is a SEM image of a VACNT forest, which was produced by depositing VACNTs on a natural pattern of a foil. This Cu foil has solid surfaces with different height and gaps between, roughly similar to steps of a staircase. FIG. 3E is a SEM image of square holes (approximately 15 µm×15 µm) in a VACNT forest on a solid substrate, which was produced by patterning the catalyst layer using photolithography. As depicted in FIGS. 2A and 2B, the empty spaces (voids, holes, or gaps) seen in the various examples shown in FIGS. 3A-E may assist in facilitating improved gas diffusion through the VACNT forests by enabling lateral gas diffusion, in addition to vertical gas diffusion 26, through the VACNT forests.

ALD gas diffusion can also be increased by applying ALD to free-standing VACNT carpets. A free-standing nanotube carpet would also allow ALD gas penetration from both the top and bottom of the carpet.

Figure 4A:
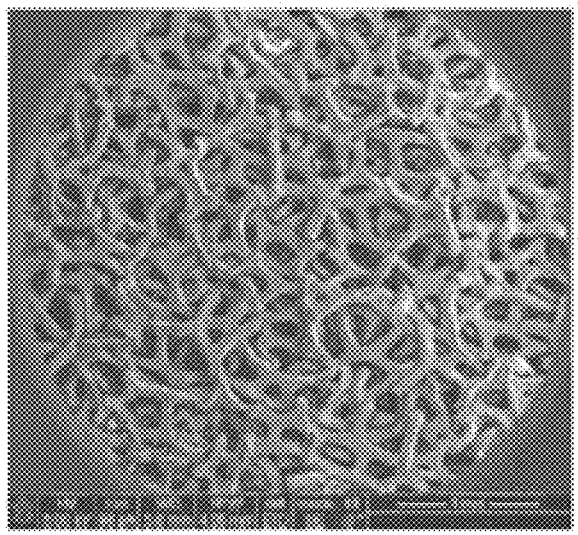
FIGS. 4A-C are SEM images of open cell foam substrates containing VACNTs at different magnifications.
Figure 4B:
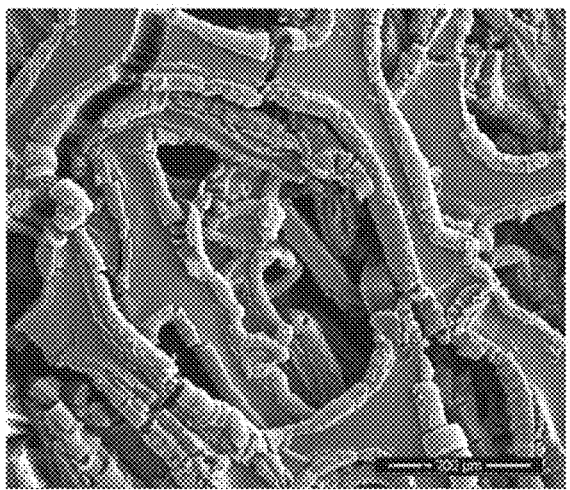
Figure 4C:
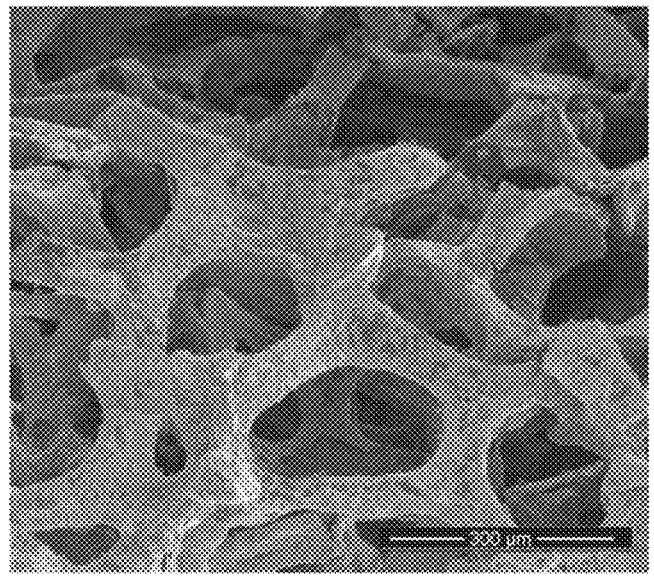
Figure 5A:
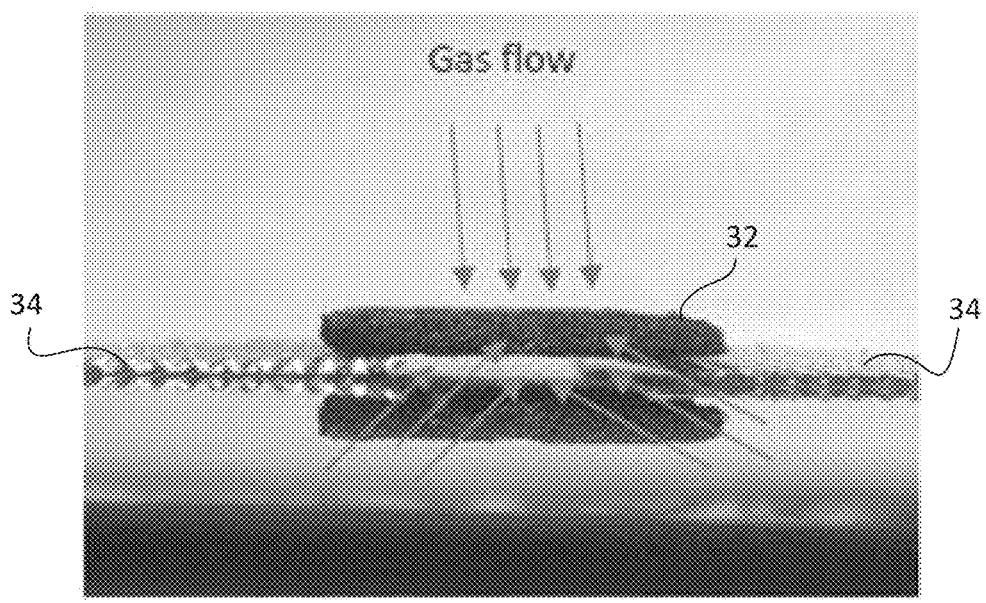
FIG. 5A is a side view picture of a foam substrate on a wire mesh platform.
Figure 5B:
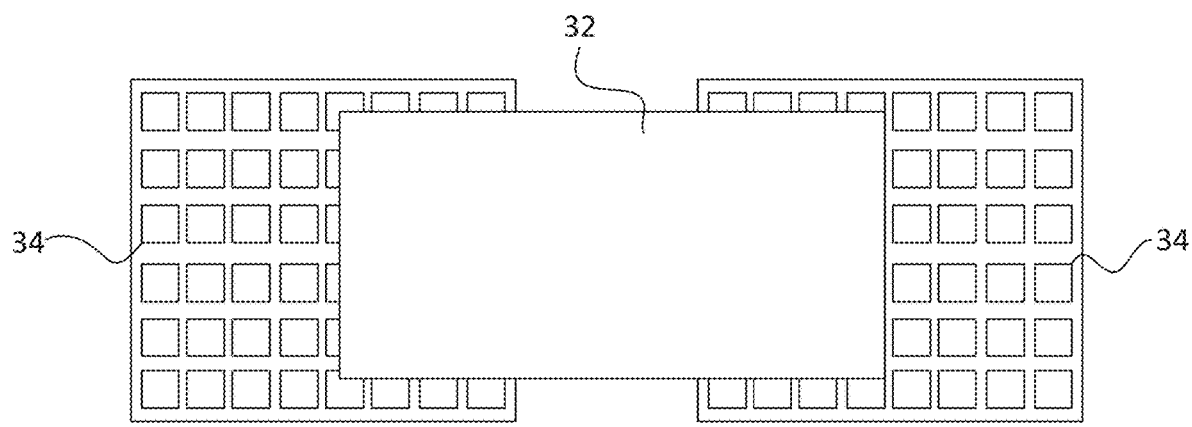
FIG. 5B is a top view diagram of a foam substrate on a wire mesh platform.

Similarly, ALD gas diffusion will also be improved by using open-cell foam substrates (such as graphene, carbon, metal, or alloy foam). Open-cell foam substrates can be used to grow VACNT or other 3D structures on the ligaments between the open-cells. SEM images of VACNT grown on open-cell foam, e.g., nickel foam, are shown FIGS. 4A-4C. The VACNT height is controlled by synthesis time. The aspect ratio can be significantly reduced by growing short VACNTs on each layer of the foam. Use of foam substrates 32 with a lot of openings will consequently decrease deposition time in the high aspect ratio ALD process, which will result in faster deposition times while retaining high loading of active material. The foam substrates 32 can also be placed on an elevated platform 34 inside the ALD chamber. For example, as seen in FIGS. 5A and 5B, a wire mesh screen can be used as a platform 34, which would enable precursor gas penetration from both the top and bottom of the foam substrate 32.

Foam Substrates

A method of retaining both high electrode loadings (mg/cm$^2$) needed for high energy density with low-aspect-ratio 3D structures for easier manufacture is herein described. The methods include using open-cell metal-foam substrates (see, e.g., FIGS. 23B and 24B), with VACNTs or other 3D structures grown on metal ligaments between the open cells in these compressible foam substrates. SEM images of an open cell metal foam are shown in FIGS. 4A-4C.

The height of the (VACNT) 3D structures on a foam substrate 32 need only be a fraction of the height that would optimally be used on a planar foil substrate to manufacture electrodes, because after coating with active material, the foam 32 can be compressed to a fraction of its original height. The height of the VACNTs on a foam substrate may be between about 10 µm and about 100 µm, alternatively between about 10 µm and about 50 µm, alternatively between about 10 µm and about 80 µm. The height of the VACNTs on a flat substrate may be between about 10 µm and about 200 µm, alternatively between about 20 µm and about 200 µm, alternatively between about 20 µm and about 150 µm, alternatively between about 20 µm and about 100 µm, alternatively between about 10 µm and about 40 µm, alternatively between about 10 µm and about 30 µm. For instance, the height of the VANCTs on the foam substrate may be about ⅕, alternatively about ¼, alternatively about ⅓ of the height of the VACNTs on a flat substrate (e.g., about 20 µm compared to about 100 µm). By selecting the optimum combination of VACNT 10 height, cell count per unit area, ligament width, and subsequent foam compression, the resulting electrode will retain the same critical characteristics (loading and thickness) as an ideal planar electrode. FIGS. 6A and 7A are SEM images of foam substrates containing VACNTs before compression and FIGS. 6B and 7B are SEM images of foam substrates containing VACNTs after compression. In addition, use of the metal-foam substrate 32 with shorter VACNTs will have a lower aspect ratio and a larger void area surrounding the VACNT forest 20 before compression, which will greatly improve the conditions for coating the (VACNT) structures 10 with active material. Because the ALD deposition time of the active material will be proportional to the square of the aspect ratio, the ALD deposition time on the foam substrate 32 can be expected to be about ¹⁄₁₆ the time for the planar electrode.

The open cell count per unit on the compressible foams are about 400 to about 10,000 per square inch, alternatively about 500 to about 10,000 per square inch, alternatively about 1,000 to about 10,000 per square inch, alternatively about 600 to about 9,000 per square inch. The porosity (void volume) can vary from about 70 to about 98%, alternatively from about 75 to about 98%, alternatively from about 75 to about 96%, alternatively from about 70 to about 99%, alternatively from about 80 to about 97%.

The width of the metal ligaments that connect to form the metal foam can be about 10 µm to about 100 µm, alternatively about 10 µm to about 95 µm, alternatively about 10 µm to about 90 µm, alternatively about 15 µm to about 100 µm, alternatively about 15 µm to about 95 µm, alternatively about 15 µm to about 90 µm, alternatively about 15 µm to about 85 µm.

The compressible foam 32 can be of any conductive material (metals or carbon) that can withstand the thermal and chemical environment required for growing the 3D structure, and the subsequent coating with any annealing of active electrode material components. The conductive material must also be able to withstand the chemical and electrochemical environment in the battery cell, and must be capable of collapsing to a thinner dimension while maintaining sufficient structural integrity and electrical conductivity to be useful as a battery electrode.

Examples of compressible foam materials that can be used for electrodes in lithium-ion batteries include but are not limited to, stainless steel, aluminum or nickel alloy for the cathode; copper or nickel for the anode; and carbon, graphene, or graphite for either the cathode or anode. In one embodiment, the foam material will have a high porosity and a high specific surface area of the ligaments. These electrodes will typically require foams with a high cell (pore) count/inch, e.g., >40 ppi to >100 ppi, ideally as high as possible, so as to provide the highest specific surface area ($cm^2$ of ligament surface per $cm^3$ of foam) available for the growth of the CNTs or other 3D structures. The cell (pore) count/inch may be about 40 ppi to about 100 ppi, alternatively about 50 ppi to about 100 ppi, alternatively about 60 ppi to about 100 ppi, alternatively about 40 ppi to about 95 ppi, alternatively >about 40 ppi, alternatively >about 50 ppi, alternatively >about 60 ppi, alternatively >about 70 ppi, alternatively >about 80 ppi, alternatively >about 90 ppi, alternatively >about 100 ppi, alternatively >about 110 ppi, where PPI is pores per inch.

The foam materials may also be coated with a thin layer of other materials to enhance or provide the required surface characteristics. For example, the foam may be coated with a thin layer of metal such as titanium, chrome, aluminum, copper, nickel, or ceramic such as $Al_2O_3$. A polymer/conductive carbon may be used as a matrix to mechanically and electronically bridge the foam structure. The polymers must be stable in the desired voltage range and compatible with the electrolyte. For example, polymers such as polyvinylidene fluoride (PVDF), styrene butadiene copolymer, polyacrylic acid (PAA), carboxy methyl cellulose (CMC).

The foam may also be compressible. In other words, the foam has the capacity to be flattened or reduced in height to about a fraction or percentage of its original height. The compressibility of the foam should be >about 30%, alternatively >about 40%, alternatively greater than about 60%, alternatively between about 30% and about 80%, alternatively between about 40% and about 80%, alternatively between about 50% and about 80%, alternatively between about 30% and about 90%, alternatively between about 40% and about 90%, alternatively between about 50% and about 90%. The foam may be reduced to about 50%, alternatively to about 40%, alternatively to about 30%, alternatively to about 20%, alternatively to about 10%, alternatively to between about 10% to about 70%, alternatively to between about 10% to about 60%, alternatively to between about 10% to about 50%, alternatively to between about 10% to about 40%, alternatively to between about 10% to about 30% of its uncompressed thickness or height.

While the current embodiment envisions using VACNTs for the 3D structure, it is recognized that other high-aspect-ratio structures could be used, such as free-standing nano rods of active material.

An open-cell foam substrate 32 can be reduced by compression to the appropriate electrode thickness after ALD deposition, e.g., to about a third of its original (uncompressed) thickness by applying a downward pressure. TABLE 1 shows a comparison of gain weight of active material for various substrates after same process. While the thickness of the electrodes are the same, open-cell foam substrates get the higher loading when processed under the same conditions.

TABLE 1

Weight of active material of various samples after the same coating processes (same batch of samples underwent low pressure chemical vapor deposition (LPCVD) followed by ALD)

| Sample (15 mm diameter) | Sample Description | Si wt. (mg) after LPCVD | $SnO_2$ wt. (mg) after ALD | Total Height of CNTs | Total Thickness Foam Electrode (foam substrate + CNTs) |
|---|---|---|---|---|---|
| 1 | Patterned CNTS on stainless steel disc | 1.38 | 8.07 | 100 μm-110 μm | |
| 2 | Patterned CNTS on stainless steel disc | 1.1 | 9.51 | 100 pm-110 μm | |
| 3 | Patterned CNTS on stainless steel disc | 1.51 | 10.05 | 100 μm-110 μm | |
| 4 | CNTs on Ni foam disc | 5.3 | 32.85 | 110 μm (after compression) | 600 μm (before compression) 210 μm (after compression) |

Moreover, as seen in TABLE 1, before compression, the foam electrode thickness is about 600 μm, and the foam electrode thickness after compression is about 210 μm. Thus, the % compression of the foam substrate is about 65%. A polymer/conductive carbon may be used as a matrix to mechanically and electronically bridge the structure. The polymers must be stable in the desired voltage range and compatible with the electrolyte. For example, polymers such as polyvinylidene fluoride (PVDF), styrene butadiene copolymer, polyacrylic acid (PAA), carboxy methyl cellulose (CMC). During compression of the foam, some of the attached VACNTs may be broken or detached, but at least 70%, alternatively at least 80%, alternatively at least 90%, alternatively at least 95% of the VACNTs remain intact and are not broken. In the case of brittle carbon foam, some of the ligaments themselves may be broken. In both cases, detachment or breakage can reduce the internal electronic conductivity of the electrode. These effects can be ameliorated by using a polymer/conductive-carbon coating.

Figure 8:
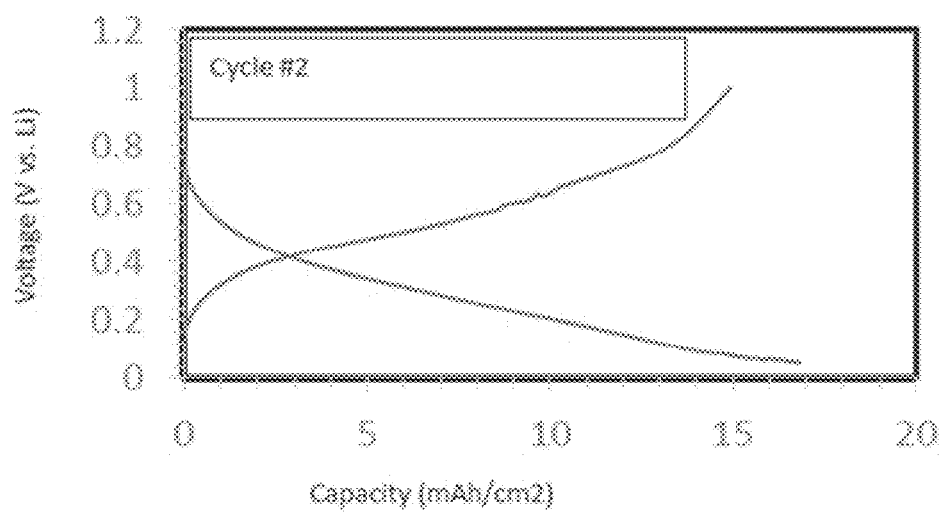
FIG. 8 is a charge/discharge profile of an $Si/SnO_2$-coated VACNT on nickel foam in a half-cell configuration at C/10.

The coatings can be applied by ALD as described in U.S. Pat. No. 7,582,544, which is hereby expressly incorporated by reference in its entirety for all purposes, and use of foam confers benefits similar to method for improving ALD on high aspect ratio structures. TABLE 1 shows the total loading of various samples after the same coatings processes, a combination of LPCVD and ALD. As seen on the TABLE 1, the foam substrate incorporated much higher loading than a regular flat substrate (e.g., stainless steel (SS) disc). Very high loading of active materials is achieved resulting in very high capacity electrode (anode) as shown FIG. 8, which is a charge/discharge profile of an Si/$SnO_2$-coated VACNT on nickel foam in a half-cell configuration at C/10. The thickness of the electrode is 110 μm. The performance of the high loading anode material Si/$SnO_2$ coated VACNT on Ni foam was tested in a half-cell coin cell against lithium metal and is presented FIG. 8. The total capacity achieved (above 15 mAh/$cm^2$) is far above the current lithium-ion anode electrode.

Figure 9:
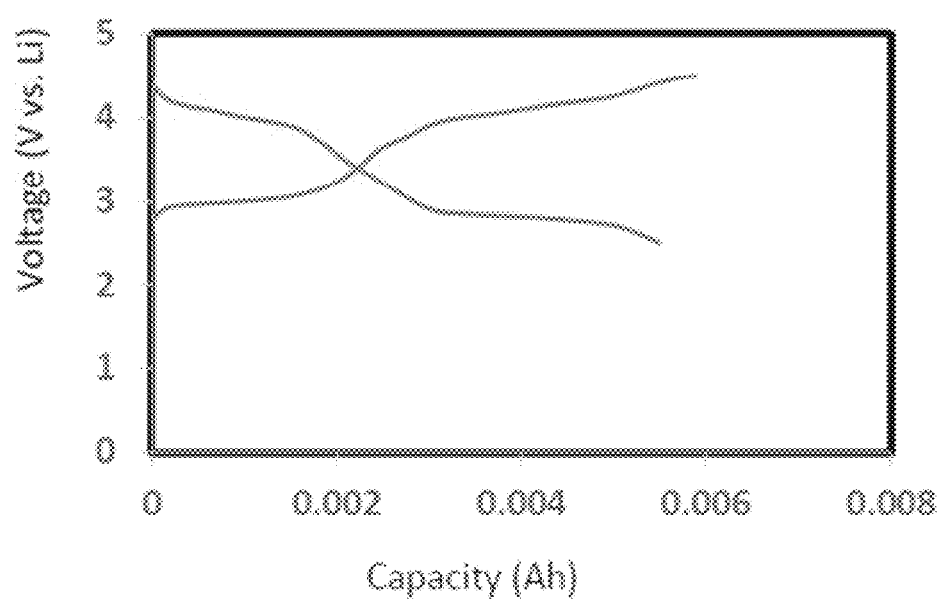
FIG. 9 is a charge/discharge profile of and $LiMn_2O_4$-coated VACNTs on graphene foam in a half-cell coin cell configuration at C/10.

The coatings can be applied by a combination of ALD and wet methods. Sol-gel methods are easier and faster to synthesize active cathode materials; however, it is very difficult to incorporate a practical amount of active material into the dense VACNT electrode. On the other hand, the ALD method provides a very conformal coating and can provide practical loading of the active material, but a thick layer may take very long to produce. Combining these two methods, however, yields advantages. A layer of $MnO_x$ may be applied by ALD onto the VACNT in a first step, and then a solution of lithium precursors such as LiOH, $LiNO_3$, or $LiClO_4$ is incorporated to the $MnO_x$/VACNT electrode by dip coating, or drop coating, or spin-coating. The organic solution must thoroughly infiltrate the VACNT forest until the stoichiometry to form $LiMn_2O_4$ is reached. After evaporation of the organic solvent, the layer of lithium precursor is reacted at a temperature greater than 300° C. in air or inert atmosphere. For example, manganese oxide was deposited onto VACNTs on graphene foam by ALD followed by dip coating in an LiOH solution. The resulting electrode was heated in air at 400° C. to form $LiMn_2O_4$ ("LMO") and further tested in a half-cell coin cell. FIG. 9 shows the high capacity obtained with a foam substrate. FIG. 9 is a charge/discharge profile of LMO-coated VACNTs on graphene foam in a half-cell coin cell configuration at C/10 (cycle 2). The LMO was formed onto the VACNTs by a combination of ALD and solution methods.

Figure 10:
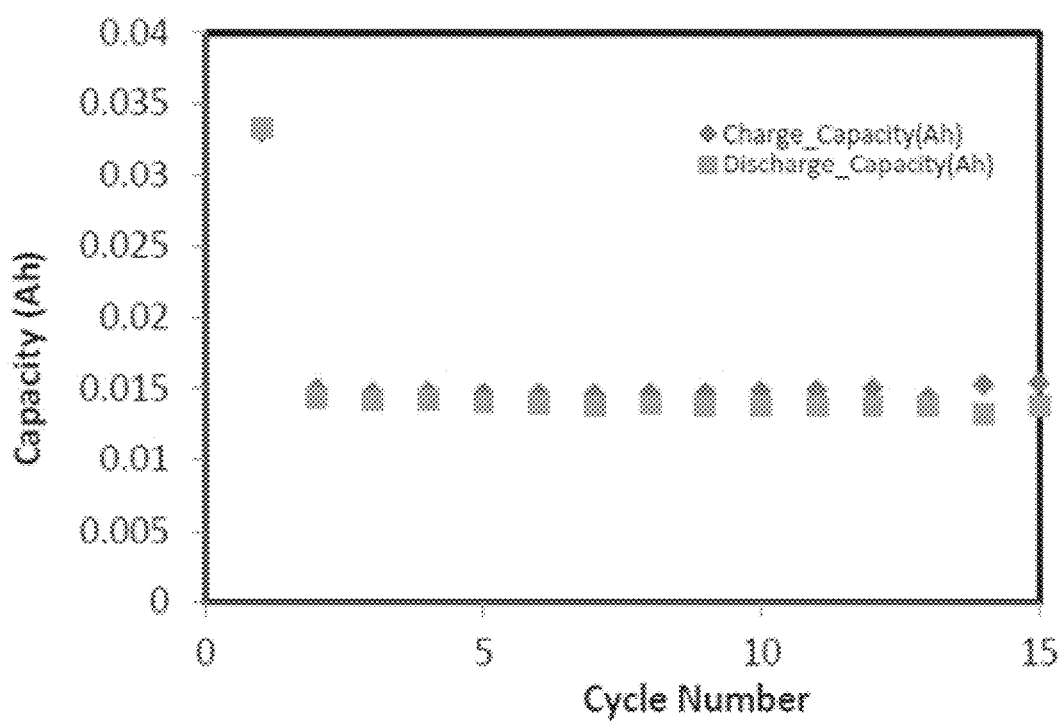
FIG. 10 shows the performances of sulfur-coated VACNTs on nickel foam in a half-cell coin cell configuration at C/10.

The coatings can be also applied by a melting method. See, e.g., Hagen, M. et al. "Lithium-sulphur batteries—binder free carbon nanotubes electrode examined with various electrolytes." J. POWER SOURCES 213; 239-48 (Sep. 1, 2012), which is hereby expressly incorporated by reference in its entirety for all purposes. For example, material such as sulfur, which has a low melting point and high affinity with carbon, can easily coat the VACNT on the foam substrate. Performance of a high loading sulfur-coated VACNT on Ni foam in a coin cell format is presented FIG. 10. The sulfur was coated using the melting method. Here again, the foam structure enables the high loading and high capacity.

Functionalization of VACNT Surfaces

Improved application of active materials to the surfaces of the VACNTs on the cathode and anode can also be accomplished by increasing the functionalization of the surfaces. Increasing the number of precursor nucleation sites and the overall affinity of the VACNT surfaces for active materials would increase the amount of active materials that can be coated onto the VACNTs. This can be accomplished with, e.g., acid functionalization, which requires a high vapor pressure acid such as fuming sulfuric acid to avoid liquid damage to the nanotube and substrate. Oxygen plasma treatment could also be employed, for which an exposure time and RF power (about 5 to about 100 Watts) must be calibrated to avoid complete destruction of the nanotubes (e.g., ~a second to two minutes). Chemical functionalization treatment could be employed using trimethylaluminum (TMA) or tetrakis (dimethylamido) titanium (TDMAT) inside the ALD chamber at temperatures below 300 C. A thick layer of adhesion material could also be applied (~2 nm or less) such as $Al_2O_3$ or $SnO_2$ $TiO_2$, prior to the ALD application of active materials.

Protective Layers to Prevent Degradation

Layering of different materials, active or otherwise, can be used to protect the primary active material from chemical or structural degradation and thereby improve cycle life.

Figure 11:
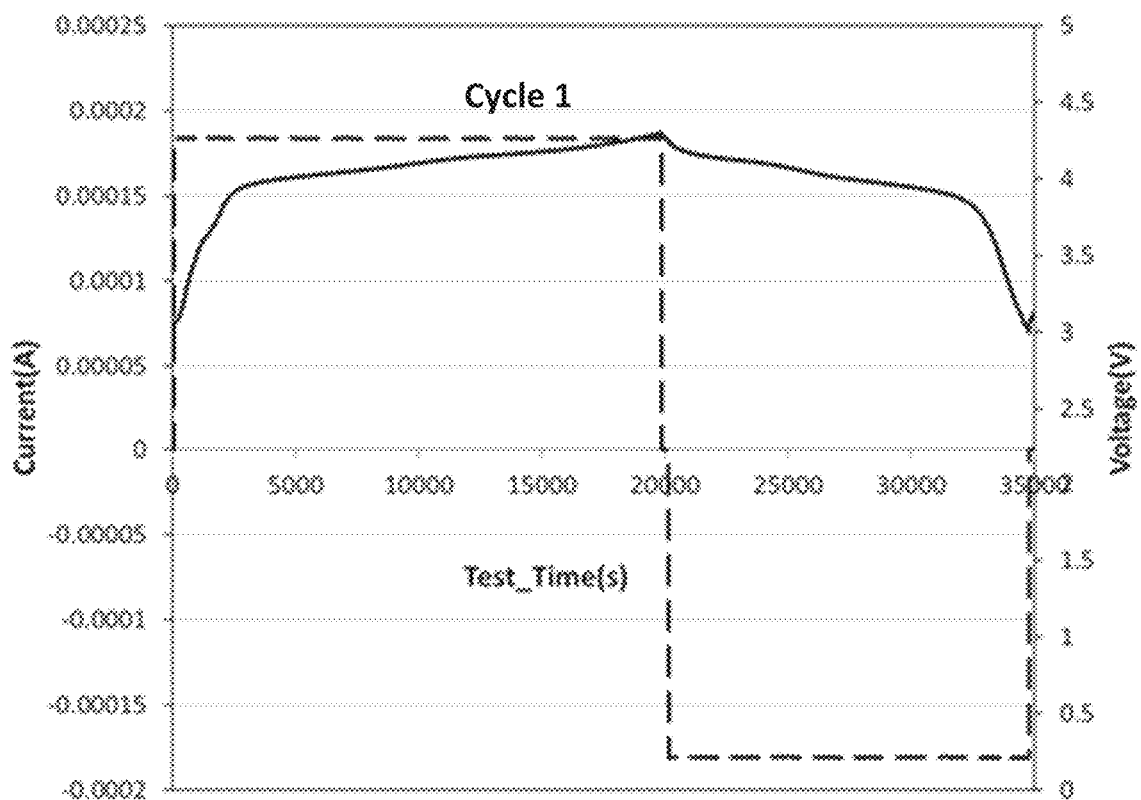
FIG. 11 is a charge/discharge profile of $LiMn_2O_4$ coated on VACNT electrodes using a sol gel method.

Protective layers can be applied to prevent damage from any subsequent fabrication processes requiring high temperatures or other corrosive environments. A thin coating (approx. 1-4 nm) of inactive material (e.g., ZnO, $V_2O_5$, can be applied to VACNTs, nanotubes, or other 3D structures, by ALD. For subsequent processing by methods such as sol-gel, this protective coating will preserve the substrate conductivity and structure by protecting the CNTs from oxidation and decomposition. FIG. 11 shows the charge/discharge profile for the first cycle of a $LiMn_2O_4$/VACNT electrode. The C-rate was C/5. A thin layer of $AL_2O_3$ was coated prior to deposition of $LiMn_2O_4$.

Although VACNTs are very stable at very high temperatures in inert atmosphere, they will start decomposing at 420° C. in air. Moreover, wet processes for the synthesis of high voltage cathode materials (such as $LiMn_2O_4$, $LiCoO_2$, NMC, LFP) generally involves calcination of precursors at high temperature in air. These conditions would damage the VACNTs, causing them to lose their properties/benefits. Even in the case of $LiMn_2O_4$ (LMO), where decomposition of the precursors occurs at lower temperature (below 400° C.), the damaging of the VACNTs is observed. Application of a conformal and uniform protective layer to prevent damage from any subsequent fabrication processes requiring high temperatures or other corrosive environments is needed. A thin coating (approx. 1-5 nm) of inactive material (e.g., $Al_2O_3$, ZnO, $V_2O_5$, . . . ) can be applied to VACNTs, nanotubes, and or other 3D structures, by ALD. For subsequent processing by wet methods, such as sol-gel, this protective coating will preserve the substrate conductivity and structure by protecting the CNTs from oxidation and decomposition.

For example, $LiMn_2O_4$ was formed by sol-gel method onto two types of VACNT: i) Uncoated VACNT, and ii) $Al_2O_3$ (4 nm) coated VACNT. The resulting electrodes LMO/VACNT were tested against Li metal in a half cell coin cell. FIGS. 12A and 12B present the charge/discharge profile of the two first cycles of a $LiMn_2O_4$/VACNT electrode (Cycling at C/6). The VACNTs in FIG. 12A were not coated with a protective layer prior to coating with the active material. The VACNTs in FIG. 12B were coated with $Al_2O_3$ by ALD prior to coating with the active material. FIG. 12B shows a large capacity from the LMO cathode material, whereas FIG. 12A shows no capacity from LMO material resulting from the loss of electron conductivity of the 3D carbon nanostructure after the LMO formation process. Sol-gel methods are generally described in Ming, H. "Gradient $V_2O_5$ surface-coated $LiMn_2O_4$ cathode towards enhanced performance in Li-ion battery applications." ELEC- TROCHIMICA ACTA 120: 390-97 (Feb. 20, 2014), which is hereby expressly incorporated by reference in its entirety for all purposes.

Method to Form $LiMn_2O_4$ on VACNT Directly Grown on a Metal Substrate:

A wet chemical method was employed to synthesize $LiMn_2O_4$ spinel material onto VACNT. In the first step, $Li(CH_3COO) \cdot 2H_2O$ and $Mn(CH_3COO)_2 \cdot 4H_2O$, in appropriate molar ratio, were dissolved in a mixture of distilled water and isopropanol. Then, the prepared solution was applied drop-wise on the top of the VACNTs. This process was followed by aging at room temperature for 10 hours without covering to obtain a gel-coated composite. Finally, the obtained gel-coated composite was calcined in air at 350° C. for 30 minutes followed by annealing at 500° C. for 1 h.

Figure 13:
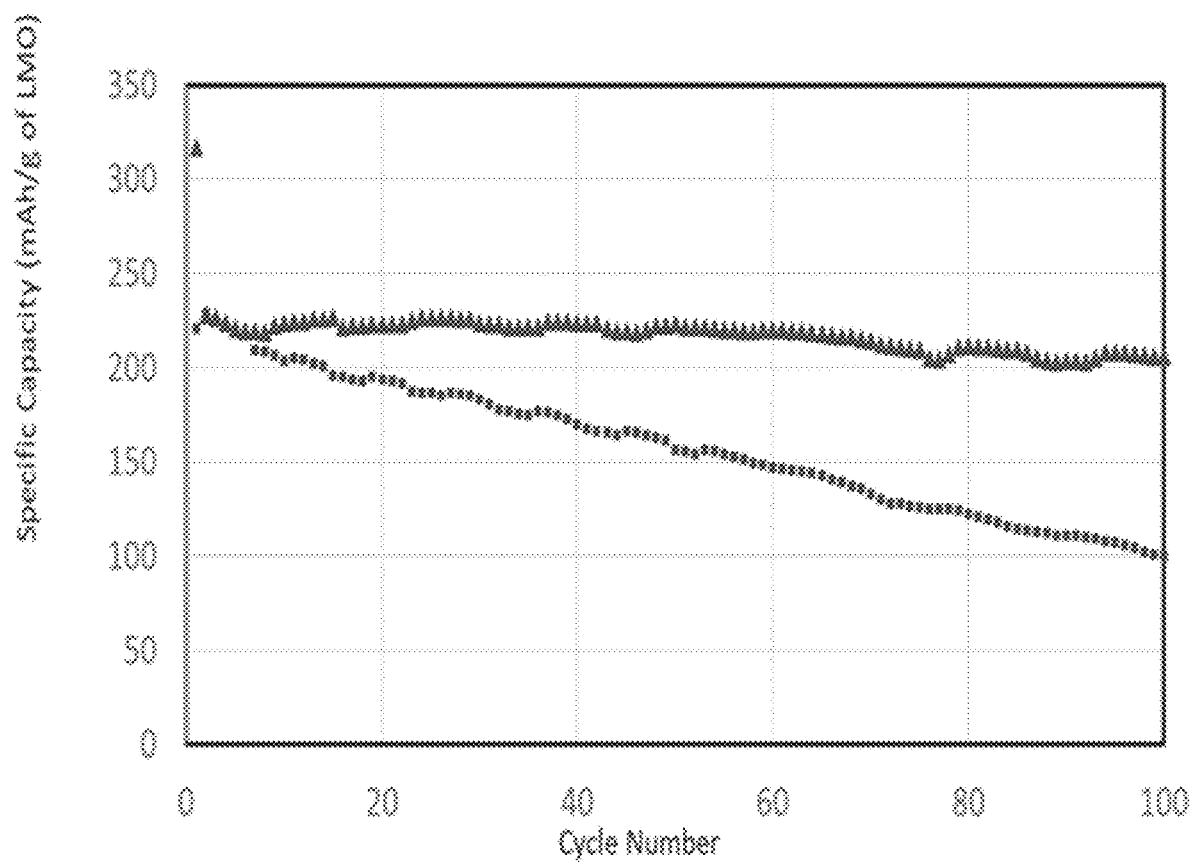
FIG. 13 shows the cycling performance of an $LiMn_2O_4$-coated VACNTs in a half cell.

Alternatively, a protective layer may be applied onto the active material using ALD. A very thin layer of inorganic compound (approx. 0.25 nm to 10 nm) such as $SnO_2$, $TiO_2$, $Al_2O_3$, ZnO can be applied to anode and cathode materials. This layer acts as a "solid electrolyte interface (SEI)", i.e., passivates the surface preventing further reduction or oxidation of the electrolyte at high and low voltages. Additionally, this layer prevents the active material from dissolution that can lead to poor cycle life. For example, manganese dissolution from LMO occurs during cycling and causes poor cycle life. A thin protective layer of $Al_2O_3$ deposited by ALD can solve the problem. As shown FIG. 13, the addition of an ALD $Al_2O_3$ thin layer onto LMO stabilizes (▲) the electrode as compared to an uncoated VACNT (■).

Direct Deposition of Active Material by ALD onto VACNT

The ALD process has several advantages, including well-controllable thickness with high uniformity, excellent conformal deposition, and low temperature growth (normally below 300° C.; some materials can be deposited at room temperature). Several ALD cathode and anode materials for Lithium ion battery (LIBs) have been studied on flat substrate and low aspect ratio structure, for example including $FePO_4$, $Li_xMn_2O_4$ and $Li_xV_2O_5$, $LiCoO_2$, $V_2O_5$, $Co_3O_4$, $RuO_2$, $SnO_2$, and $TiO_2$, $Cu_2S$, $SiO_x$.

Figure 18A:
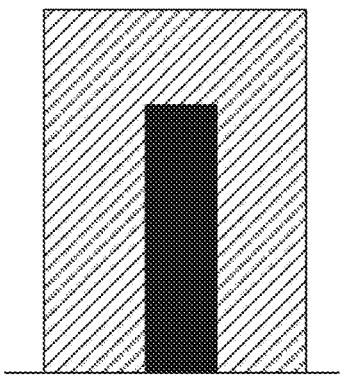
FIG. 18A is an example of an anode or cathode configuration having a single layer of material A.
Figure 18B:
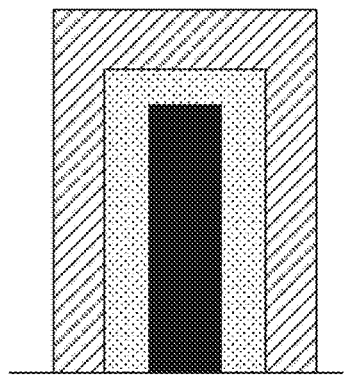
FIG. 18B is an example of an anode or cathode configuration having multiple layers.
Figure 18C:
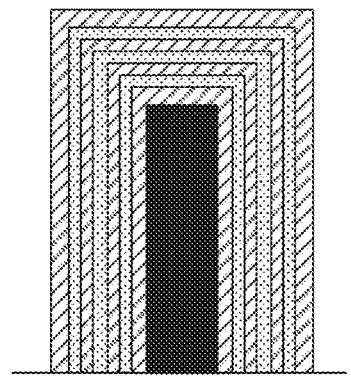
FIG. 18C is an example an anode or cathode configuration having nanolamination of materials A and B.

The electrode (cathode or anode) may have a single active layer or multiple active layers. In the case of multiple active layers, the last active layer can also serve as protective layer, preventing the electrolyte from decomposing further at low electrochemical potential. Alternatively, the active material can be sequentially layered by, e.g., ALD, or can be applied using nanolamination of various materials. FIGS. 18A-18C shows examples of the three different electrode configurations on a single CNT—single layer (FIG. 18A), multiple layers (FIG. 18B), and nanolamination (FIG. 18C).

Cathode Protective Layers

Cathodes will comprise at least one primary active material, such as $Li_xMn_2O_4$ or $LiCoO_2$, that may be protected by a layer of at least one secondary active material, such as $Li_cV_2O_5$ or $LiFePO_4$, applied by ALD.

Figure 14:
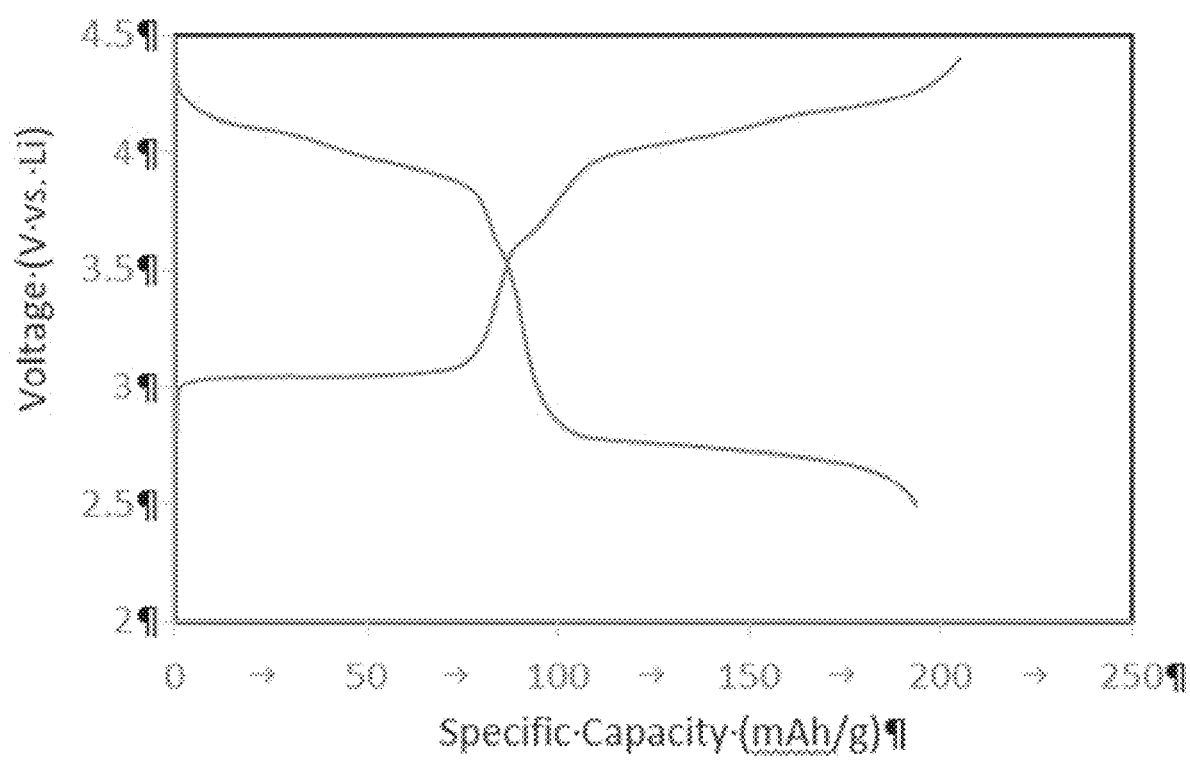
FIG. 14 shows the charge/discharge profile of $LiMn_2O_4$ coated on VACNT electrode using ALD method (The C-rate was C/10). $LiMn_2O_4$ loading is 9.7 mg/cm$^2$.

Lithiation of primary materials may occur at multiple points in time during the ALD process, either to single layers or multiple layers simultaneously. Lithiation can be tailored at each step for the active materials. This will permit maximal and consistent lithiation of the cathode. Post-deposition anneal may be applied. FIG. 14 shows the charge/discharge profile at cycle 2 of VACNT coated with $LiMn_2O_4$ coated on VACNTs using ALD method. The C-rate was C/10. $LiMn_2O_4$ loading was 9.7 mg/cm².

Direct deposition of cathode materials is more challenging than for the anode materials because it generally involves a mixture of two or more materials. Cathode active materials can be $Li_xV_2O_5$, $V_2O_5$, $LiNiO_2$, $LiMn_2O_4$, $LiCoO_2$, $FePO_4$, $LiFePO_4$, $Li(Mn,Ni,Co)O_2$, $Li(Ni,Co,Al)O_2$. Cathodes can comprise a single active material layer onto VACNT, or can comprise multiple layers of various cathode active materials, such as $LiMn_2O_4/FePO_4$, or $LiMn_2O_4/LiNiO_2/FePO_4$. In the case of multiple layers, the last active layer can also serve as protective layer, preventing the electrolyte to decompose at high electrochemical potential. Alternatively, the cathode can be a nanolamination of various materials. The nanolamination, depending on the ALD cycle ratio, can result in the formation of a new complex compound. A pre-coat of a thin ALD layer, such as $Al_2O_3$, onto VACNT may be apply prior to ALD deposition of the cathode active material, especially if further annealing is required to form the electro-active material. Nanolamination is similar to ALD, except that each cycle can involve 1 to n different precursors. See, e.g., Donders, M. E. "Remote Plasma Atomic Layer Deposition of Thin Films of Electrochemically Active $LiCoO_2$." ECS Transactions, Vol. 41, 220$^{th}$ ECS Meeting, Oct. 9-14, 2011, Boston, MA, Number 2, which is hereby expressly incorporated by reference in its entirety for all purposes.

Figure 15:
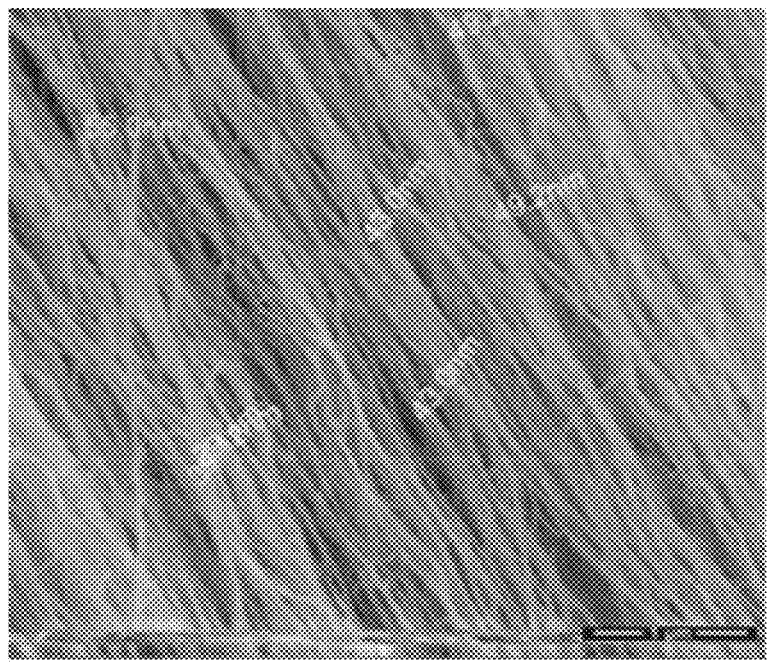
FIG. 15 is a SEM image of an $LiMn_2O_4$-coated VACNT using ALD.
Figure 16:
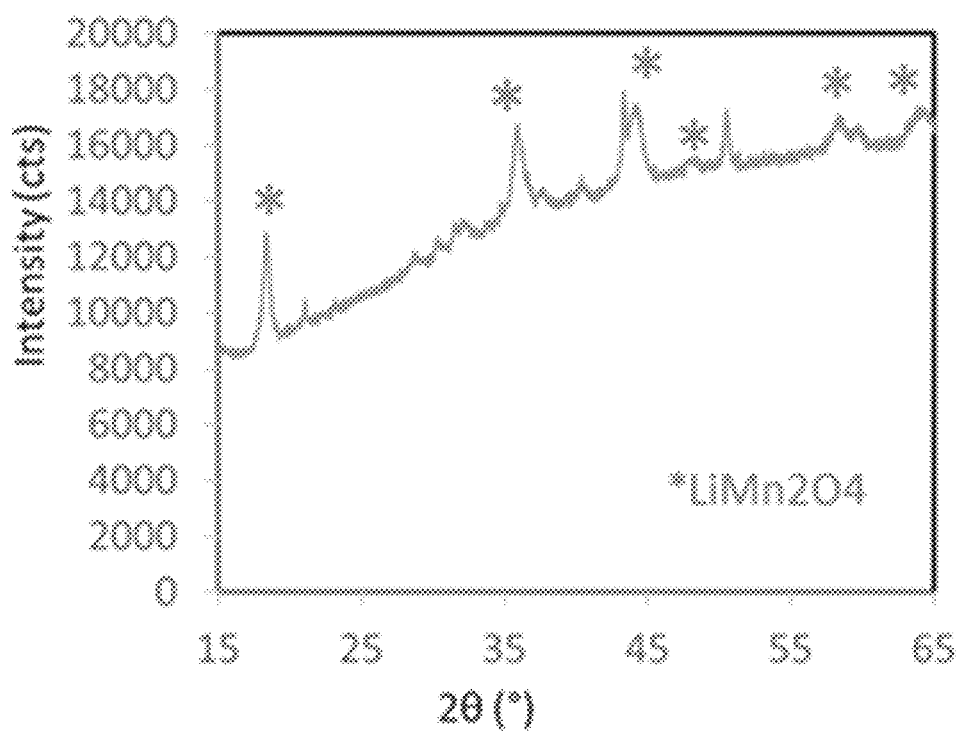
FIG. 16 shows the X-ray diffraction pattern of an $LiMn_2O_4$-coated on a VACNT.
Figure 17:
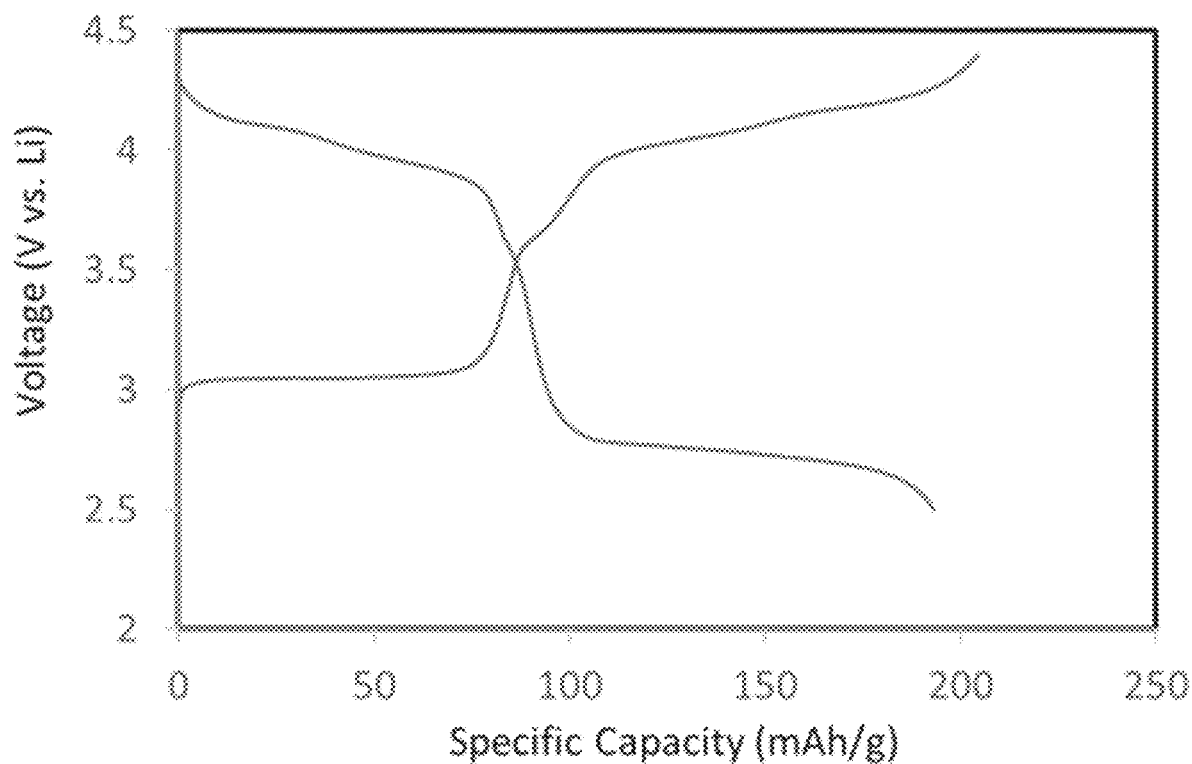
FIG. 17 shows the charge/discharge profile of an $LiMn_2O_4$-coated VACNT electrode using the ALD method in a half cell.

A single layer of $LiMn_2O_4$ can also be applied. A layer of $LiMn_2O_4$ (LMO) is obtained by alternating ALD cycles of two binary compounds $Li_2O$ (or LiOH) and $MnO_x$. The resulting thick layer is subsequently heated in air at 300° C. for 5 minutes to form $LiMn_2O_4$. SEM image of VACNT coated with LMO cathode material is shown FIG. 15. The VACNT structure is fully covered with a conformal and uniform coating. X-ray diffraction (XRD) analysis of the electrode shows that $LiMn_2O_4$ spinel has been formed (FIG. 16). The thickness of the material can range from 0.5 nm to 100 nm. FIG. 17 shows the charge/discharge profile of LMO ALD deposited on VACNT electrode tested against Li metal in a half-cell coin cell. The specific capacity is about 200 mAh/g, which is close to the theoretical specific capacity of LMO when the voltage range is 4.4V-2.5V vs Li. The C-rate is C/10 and the LMO loading is 9.7 mg/cm².

Anode Protective Layers

Anodes will comprise at least one primary active material, such as amorphous or poly-silicon which can be deposited on the substrate by LPCVD or FUND. See, e.g., Forney, M. W. et al. "High performance silicon free-standing anodes fabricated by low pressure and plasma-enhanced chemical vapor deposition onto carbon nanotube electrodes." J. Power Sources 228: 270-80 (Apr. 15, 2013), which is hereby expressly incorporated by reference in its entirety for all purposes. This primary active material (Si) can then be coated with a second active material, such as $SnO_x$ or $TiO_2$, to serve as a protective layer. This protective layer will be lithium-ion conductor and will protect the silicon from further reacting with the electrolyte during cycling.

Protective anode secondary layers may also be organic materials, such as Alucone, applied by molecular layer deposition (MLD). A protective layer may also be a combination of inorganic and organic layers to make a protective, and partially active, secondary layer (applied by MLD+ALD or other methods). An anode may also be comprised of a thin (~2 nm) ALD coating of an adhesion layer (e.g. Si, SnO, or $Al_2O_3$) and a low-melting-temperature active material (<400° C., for example, Sn or Sn/Al alloy), which is then melted so as to cover the CNTs by wicking down the forest.

Active materials can be $SnO_2$, $SiO_x$, $RuO_2$, $TiO_2$, $Cu_2S$. These active materials are binary compounds. Anodes can comprise a single active material layer covering VACNTs, or can comprise multiple layers of various anode active materials, such as $SiO_x/SnO_2$, or $SiO_x/SnO_2/TiO_2$. In the case of multiple layers, the last active layer can also serve as protective layer, preventing the electrolyte from decomposing further at low electrochemical potential. Alternatively, the anode can be nanolamination of various materials. FIGS. 18A-18C shows examples of the three different anode configurations on a single CNT—single layer, multiple layers, or nanolamination.

Figure 19:
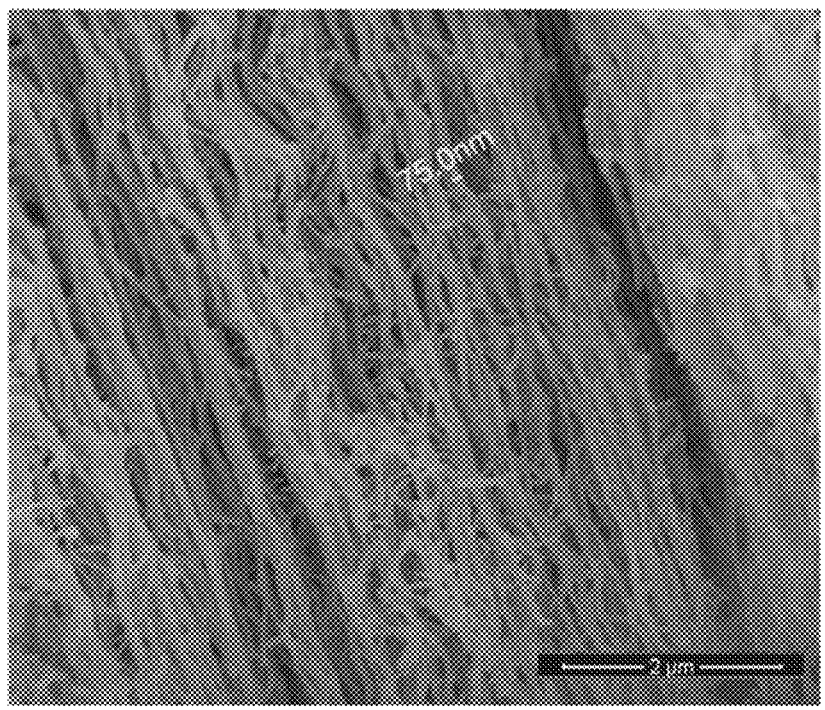
FIG. 19 is a SEM image of SnO$_2$-coated VACNT using ALD.

Method of Making a Single Layer of $SnO_2$:

Tetrakis(dimethylamino)tin(IV) ("TDMASn") is employed as an Sn precursor and $H_2O$ as an oxidizing agent, has been tuned and optimized to allow coating of the high aspect ratio VACNT forest. Thermal ALD of $SnO_2$ thin films were deposited at 200° C. using TDMASn (99.99%-Sn) and $H_2O$. Ar gas was used as a carrier gas at a flow rate of 120 sccm. The process was performed at a purge pressure of 1.2 Torr and a deposition pressure of 10 Torr. The TDMASn precursor cylinder temperature is held at 55° C., with a dedicated 30 sccm Ar flow during cylinder charging and dosing. The ALD $SnO_2$ sequence was as follows:

TDMASn flow-through ampoule charge (1 s) with Ar gas at 30 sccm.
TDMASn dose from ampoule (2 s) at 30 sccm.
TDMASn exposure to sample (45 s) at 10 Torr.
Chamber purge with argon (90 s) at 1.2 Torr.
$H_2O$ dose from vapor-draw ampoule (0.300 s).
$H_2O$ exposure to sample (60 s) at 10 Torr.
Chamber purge with argon (90 s) at 1.2 Torr The resulting layer of $SnO_2$ is uniform and conformal from the bottom to the top of the VACNT forest, as shown FIG. 19.

Figure 20:
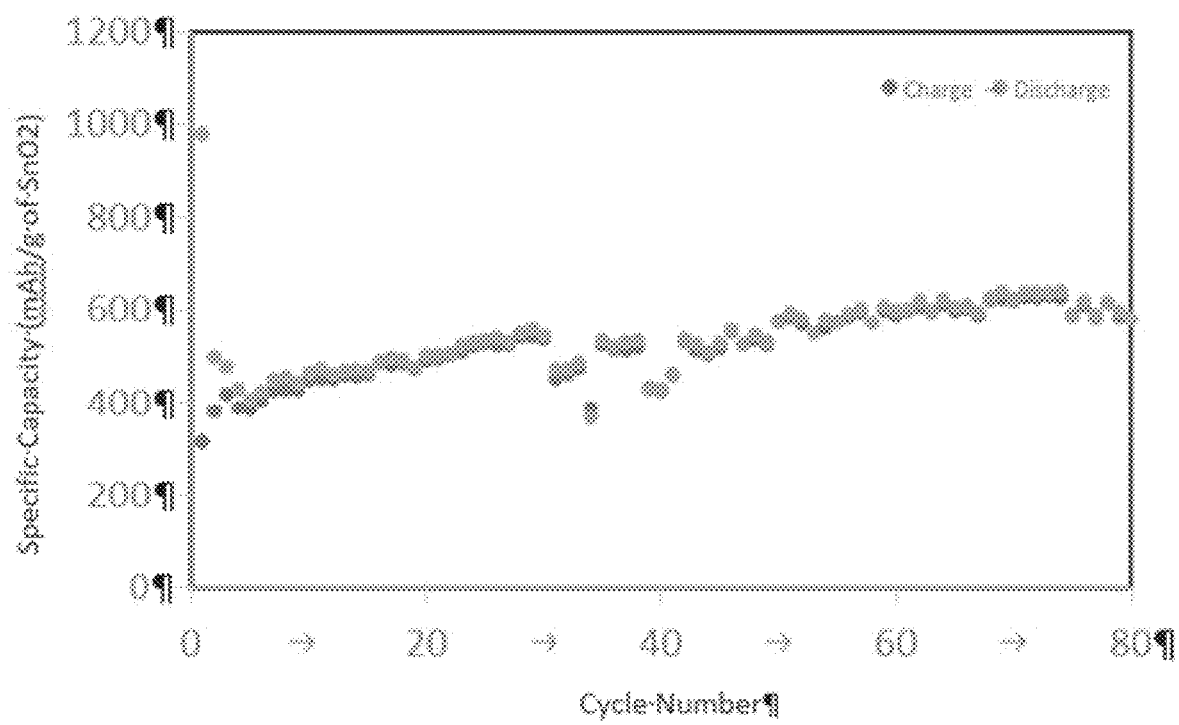
FIG. 20 shows the performances of VACNTs coated with SnO$_2$ by ALD.
Figure 21:
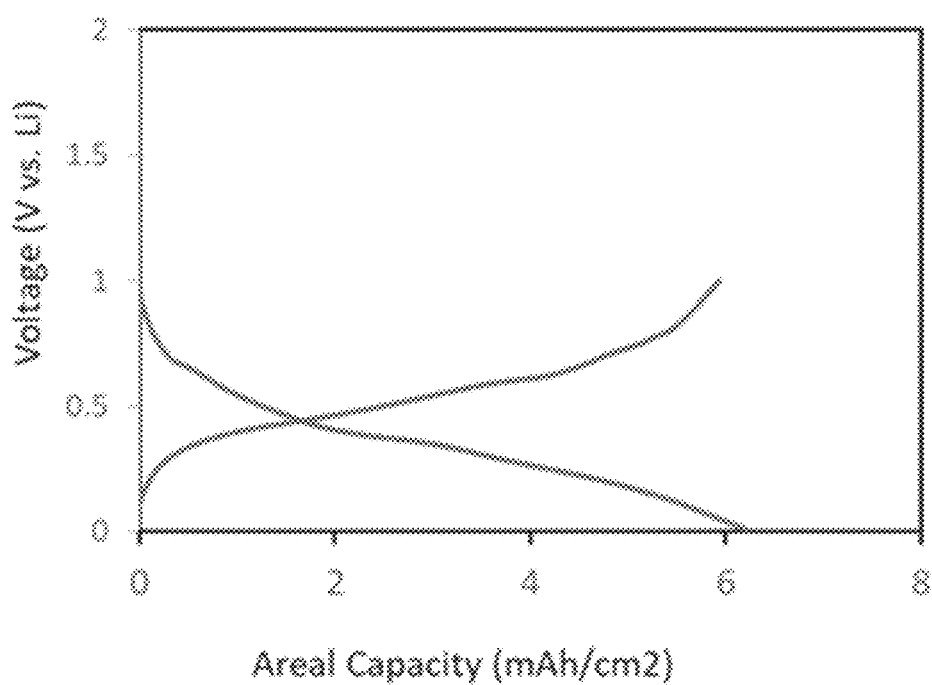
FIG. 21 shows the charge/discharge profile of an SnO$_2$-coated VACNT electrode using ALD.
Figure 22:
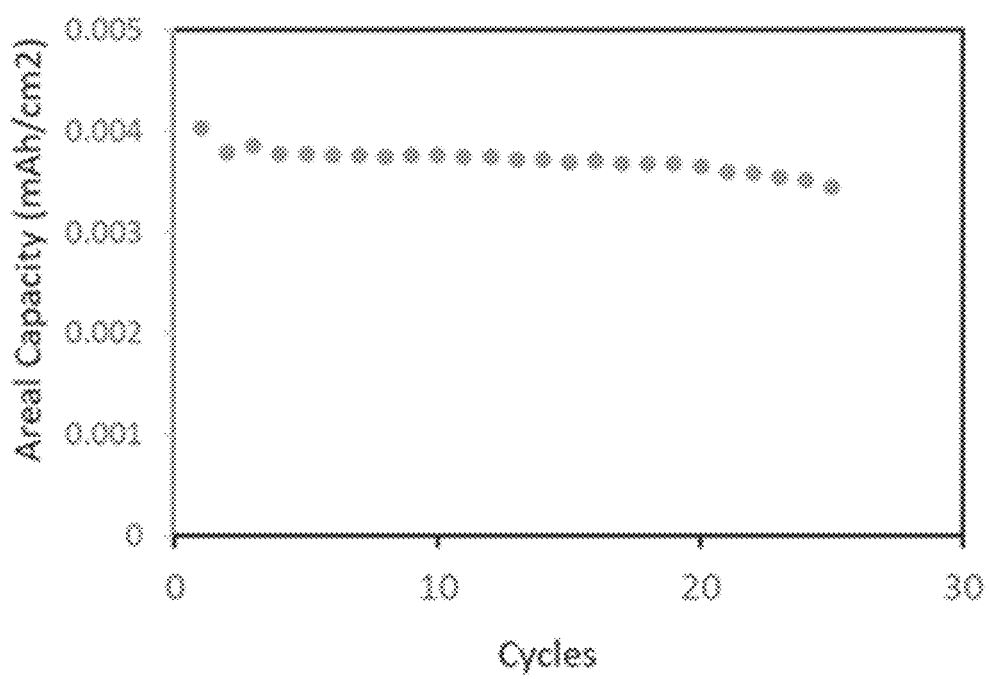
FIG. 22 shows the cycling performance of an ALD SnO$_2$-coated VACNT anode in a full cell coin paired with an LCO cathode.

The amount of ALD active materials can well be controlled with different numbers of deposition cycles. The thickness of the deposited material can range from 0.5 nm to 50 nm. The increase of the thickness will increase the loading of the electrode and thus the areal capacity. Because of the high surface area of the 3D VACNT structure and the ability to coat tall VACNT forests, very high loading of material ($mg/cm^2$) can be achieved while electrochemical performances are maintained due to the nano dimensions of the active material layer and the high electrical conductivity of the nanotubes. FIG. 20 shows the cycling performance of VACNT coated with $SnO_2$ by ALD. The C-rate was C/5. $SnO_2$ loading is 4.7 $mg/cm^2$. FIG. 21 shows the charge/discharge profile of a $SnO_2$ ALD deposited on VACNT electrode tested against Li metal in a half-cell coin cell. The capacity achieved is greater than 6 $mAh/cm^2$, which is more than the practical capacity achieved in conventional LiBs. As seen in FIG. 22, this anode was paired with a $LiCoO_2$ commercial cathode in a coin cell and shows very good areal capacity and cyclability (C-rate=C/6).

Methods of Fabricating Cathodes and Anodes for Lithium Ion Batteries

Figure 23A:
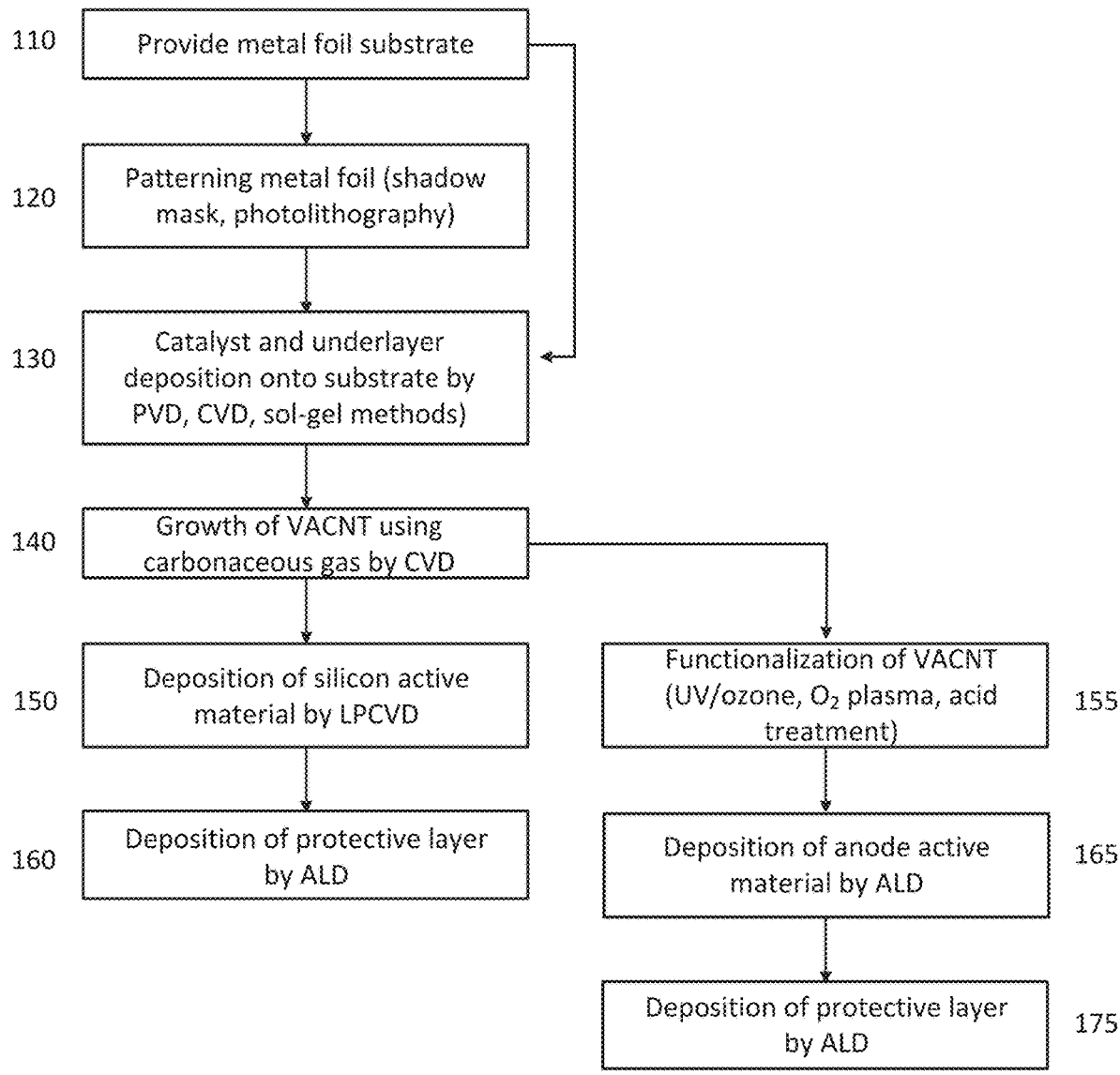
FIGS. 23A and 23B are flow charts of different methods for making anodes for lithium ion batteries.

Referring to FIG. 23A, a method for making an anode that includes a VACNT forest as the current collector is described. The method includes the following steps:

110: A metal foil substrate is provided.
120: The metal foil is patterned using, e.g., a shadow mask or photolithography. This step is optional and can be skipped when, depositing VACNTs on plain metal foil.
130: A catalyst (e.g., Fe, Ni) and underlayer (e.g., $Al_2O_3$, $SiO_2$, Cr, Ti) are deposited on one or both sides of the metal foil substrate by PVD, CVD, or sol-gel methods.
140: The VACNT forest (plurality of VACNTs) is grown on one or both sides of the metal foil substrate using carbonaceous gas by CVD.
150: A silicon active material is deposited on the VACNTs by LPCVD.
160: A protective layer is deposited by ALD.

An alternative method is also described in FIG. 23A. The method includes the following steps:

110: A metal foil substrate is provided.
120: The metal foil is patterned using, e.g., a shadow mask or photolithography. This step is optional and can be skipped when, depositing VACNTs on plain metal foil.
130: A catalyst (e.g., Fe, or Ni) and underlayer (e.g., $Al_2O_3$, Ti, Cr, $SiO_2$) are deposited on one or both sides of the metal foil substrate by PVD, CVD, sol-gel methods.
140: The VACNT forest (plurality of VACNTs) is grown on one or both sides of the metal foil substrate using carbonaceous gas by CVD.
155: The VACNTs are functionalized with e.g., UV/ozone, $O_2$ plasma, or acid treatment.
165: An anode active material is deposited on the VACNTS by ALD.
175: A protective layer is deposited by ALD.

Figure 23B:
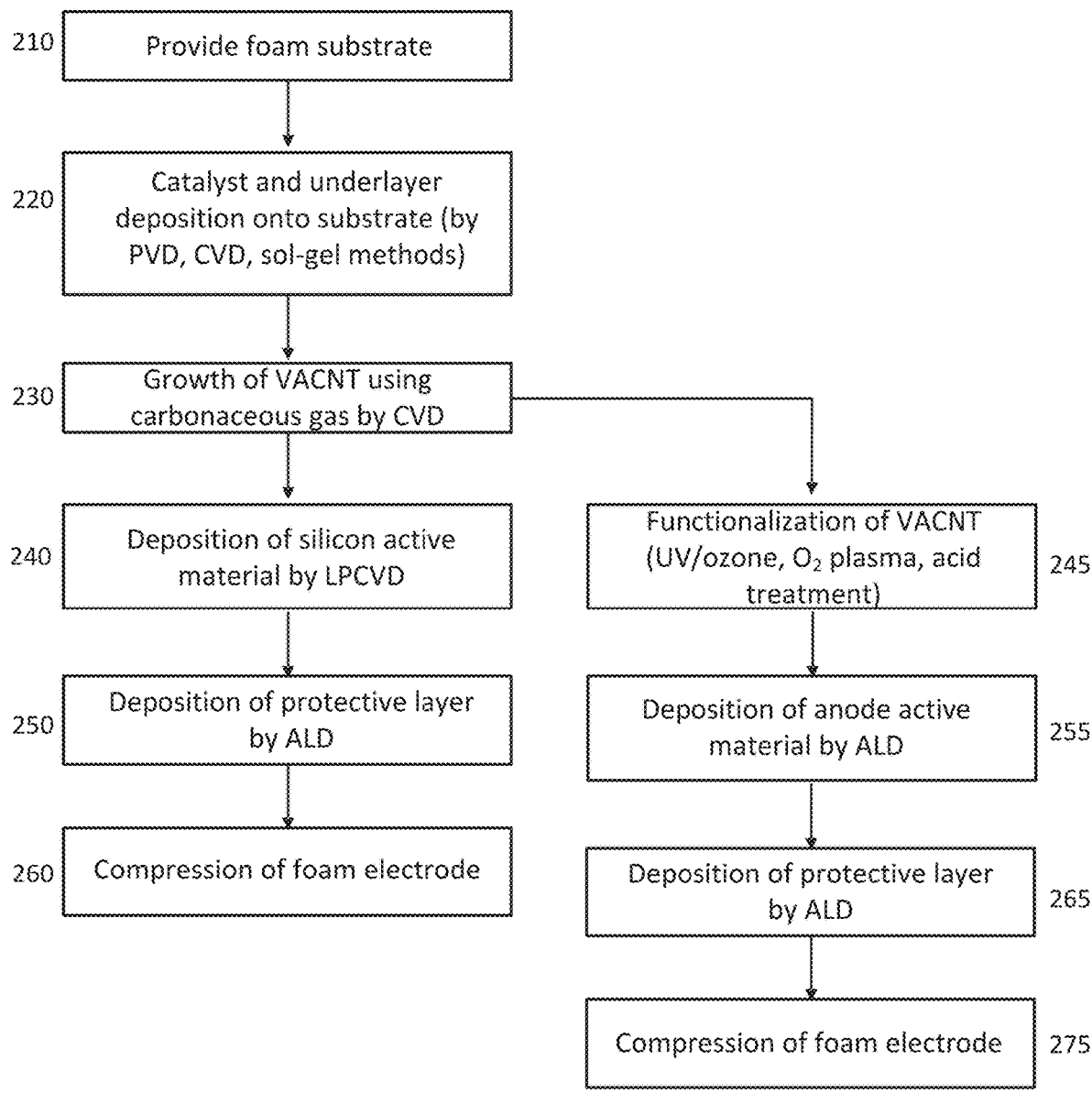

Referring to FIG. 23B, a method for making an anode that includes a VACNT forest as the current collector on a compressible foam substrate is described. The method includes the following steps:

210: A foam substrate is provided.
220: A catalyst (e.g., Fe, or Ni) and underlayer (e.g., $Al_2O_3$, Ti, Cr, $SiO_2$) are deposited on the foam substrate by PVD, CVD or sol-gel methods.
230: The VACNT forest (plurality of VACNTs) is grown on the foam substrate using carbonaceous gas by CVD.
240: A silicon active material is deposited on the VACNTs by LPCVD.
250: A protective layer is deposited on the VACNTs by ALD.
260: The foam substrate is compressed.

An alternative method is also described in FIG. 23B. The method includes the following steps:

210: A foam substrate is provided.
220: A catalyst (e.g., Fe, or Ni) and underlayer (e.g., $Al_2O_3$, Ti, Cr, $SiO_2$) are deposited on the foam substrate by PVD, CVD or sol-gel methods.
230: The VACNT forest (plurality of VACNTs) is grown on the foam substrate using carbonaceous gas by CVD.
245: The VACNTs are functionalized with e.g., UV/ozone, $O_2$ plasma, or acid treatment.
255: An anode active material is deposited on the VACNTS by ALD.
265: A protective layer is deposited onto the VACNTs by ALD.
275: The foam is compressed.

Figure 24A:
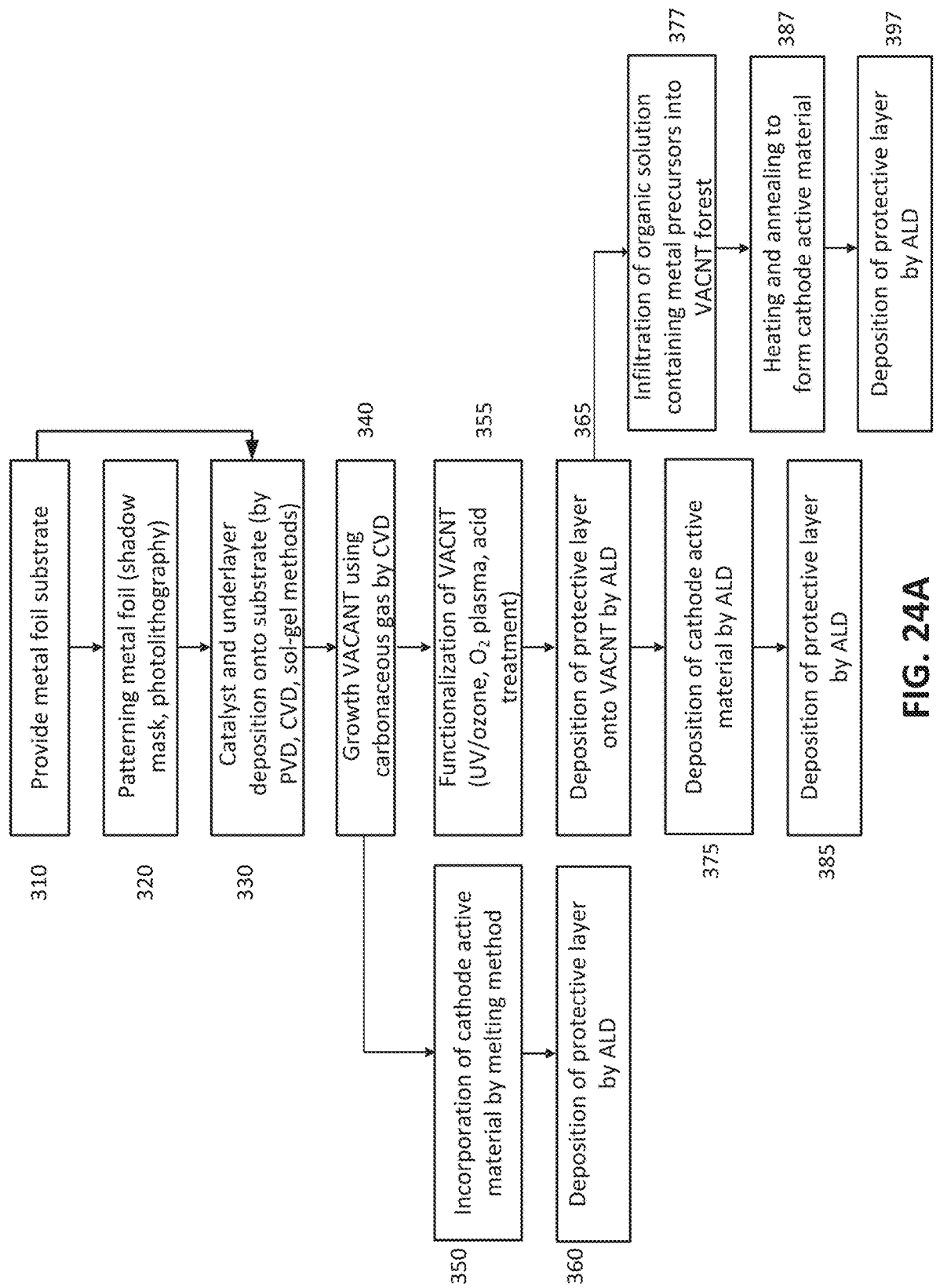
FIGS. 24A and 24B are flow charts of different methods for making cathodes for lithium ion batteries.

Referring to FIG. 24A, a method for making a cathode that includes a VACNT forest as the current collector is described. The method includes the following steps:

310: A metal foil substrate is provided.
320: The metal foil is patterned using, e.g., a shadow mask or photolithography. This step is optional and can be skipped when depositing VACNTs on plain metal foil.
330: A catalyst (e.g., Fe or Ni) and underlayer (e.g., $Al_2O_3$, Ti, Cr, $SiO_2$) are deposited on one or both sides of the metal foil substrate by PVD, CVD or sol-gel methods.
340: The VACNT forest (plurality of VACNTs) is grown on one or both sides of the metal foil substrate using carbonaceous gas by CVD.
350: Cathode active material is incorporated onto the VACNTs by a melting method.

360: A protective layer is deposited by ALD.

An alternative method is also described in FIG. 24A. The method includes the following steps:

310: A metal foil substrate is provided.

320: The metal foil is patterned using, e.g., a shadow mask or photolithography. This step is optional and can be skipped when depositing VACNTs on plain metal foil.

330: A catalyst (e.g., Fe or Ni) and underlayer (e.g., $Al_2O_3$, $SiO_2$, Ti, Cr) are deposited on one or both sides of the metal foil substrate by PVD, CVD or sol-gel methods.

340: The VACNT forest (plurality of VACNTs) is grown on one or both sides of the metal foil substrate using carbonaceous gas by CVD.

355: The VACNTs are functionalized with e.g., UV/ozone, $O_2$ plasma, or acid treatment.

365: A protective layer is deposited onto the VACNTs by ALD.

375: Cathode active material is deposited onto the VACNTs by ALD.

385: An additional protective layer is deposited onto the VACNTs by ALD.

An additional alternative method is also described in FIG. 24A, which includes incorporating cathode active material using a sol-gel method. The method includes the following steps:

310: A metal foil substrate is provided.

320: The metal foil is patterned using, e.g., a shadow mask or photolithography. This step is optional and can be skipped when depositing VACNTs on plain metal foil.

330: A catalyst (e.g., Fe or Ni) and underlayer (e.g., $Al_2O_3$, Ti, Cr, $SiO_2$) are deposited on one or both sides of the metal foil substrate by PVD, CVD or sol-gel methods.

340: The VACNT forest (plurality of VACNTs) is grown on one or both sides of the metal foil substrate using carbonaceous gas by CVD.

355: The VACNTs are functionalized with e.g., UV/ozone, $O_2$ plasma, or acid treatment.

365: A protective layer is deposited onto the VACNTs by ALD.

377: An organic solution containing metal precursors infiltrates the VACNT forest.

387: The VACNTs are heated and annealed to form the cathode active material.

397: A protective layer is deposited onto the VACNTs by ALD.

Figure 24B:
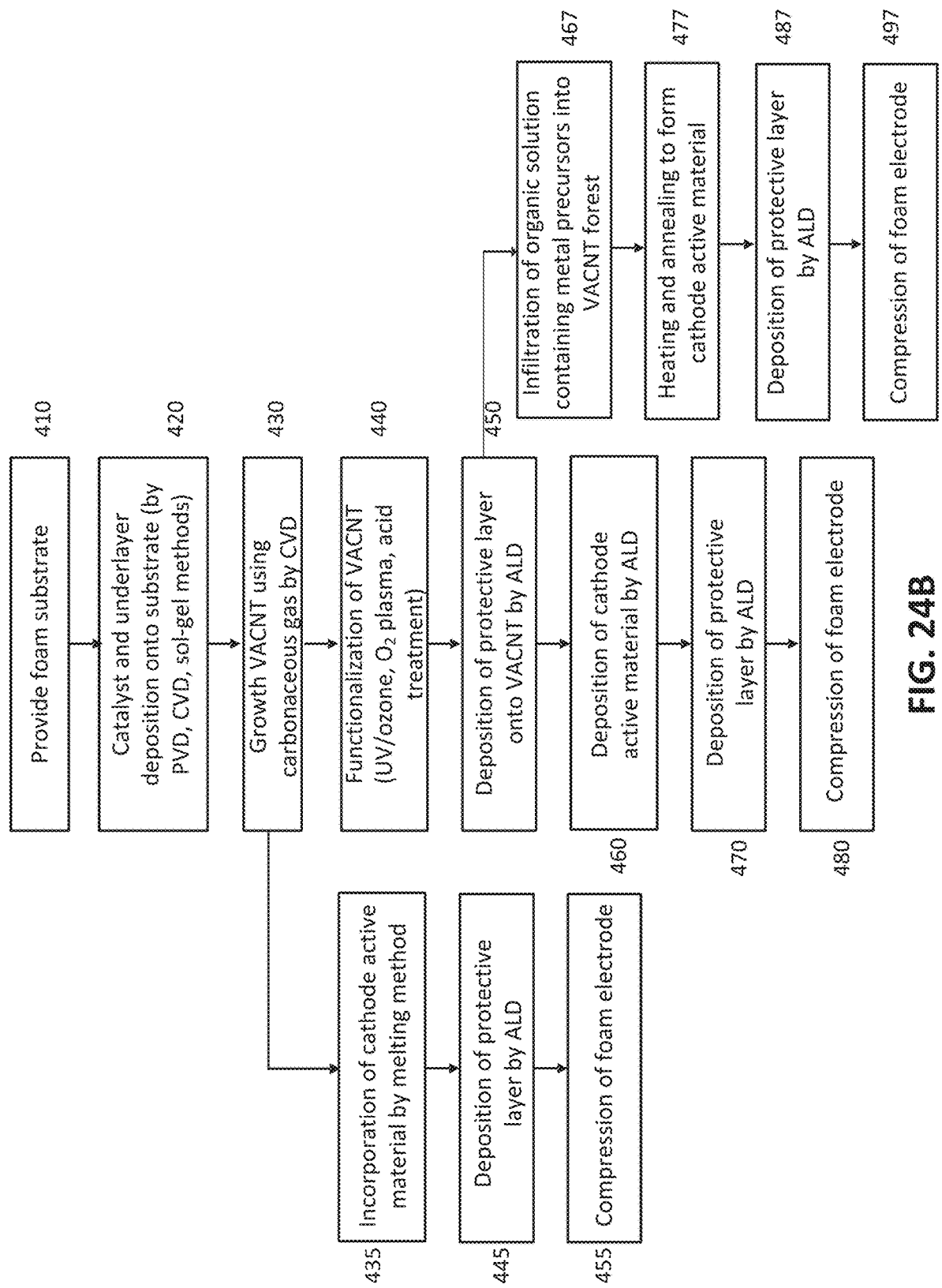

Referring to FIG. 24B, a method for making a cathode that includes a VACNT forest as the current collector is described. The method includes the following steps:

410: A foam substrate is provided.

420: A catalyst (e.g., Fe or Ni) and underlayer (e.g., $Al_2O_3$, Ti, Cr, $SiO_2$) are deposited on the metal foil substrate by PVD, CVD or sol-gel methods.

430: The VACNT forest (plurality of VACNTs) is grown on the foam substrate using carbonaceous gas by CVD.

440: The VACNTs are functionalized with e.g., UV/ozone, $O_2$ plasma, or acid treatment.

450: A protective layer is deposited onto the VACNTs by ALD.

460: Cathode active material is deposited onto the VACNTs by ALD.

470: A protective layer is deposited onto the VACNTs by ALD.

480: The foam electrode is compressed.

An alternative method is also described in FIG. 24B. The method includes the following steps:

410: A foam substrate is provided.

420: A catalyst (e.g., Fe or Ni) and underlayer (e.g., $Al_2O_3$, Ti, Cr, $SiO_2$) are deposited on the metal foil substrate by PVD, CVD or sol-gel methods.

430: The VACNT forest (plurality of VACNTs) is grown on the foam substrate using carbonaceous gas by CVD.

435: Cathode active material is incorporated onto the VACNTs by the melting method.

445: A protective layer is deposited onto the VACNTs by ALD.

455: The foam electrode is compressed.

An alternative method is also described in FIG. 24B, which includes incorporating cathode active material using a sol-gel method. The method includes the following steps:

410: A foam substrate is provided.

420: A catalyst (e.g., Fe or Ni) and underlayer (e.g., $Al_2O_3$, Ti, Cr, $SiO_2$) are deposited on the metal foil substrate by PVD, CVD or sol-gel methods.

430: The VACNT forest (plurality of VACNTs) is grown on the foam substrate using carbonaceous gas by CVD.

440: The VACNTs are functionalized with e.g., UV/ozone, $O_2$ plasma, or acid treatment.

450: A protective layer is deposited onto the VACNTs by ALD.

467: An organic solution containing metal precursors infiltrates the VACNT forest.

477: The VACNTs are heated and annealed at a high temperature to form the cathode active material.

487: A protective layer is deposited onto the VACNTs by ALD.

497: The foam electrode is compressed.

Characteristics of Lithium Ion Batteries Including VACNTs

A battery cell is the basic electrochemical unit that provides the source of electrical energy through conversion of chemical energy and includes an assembly of electrodes (anode and cathode), separators, electrolyte, container, and terminals. The battery cell is a single power generating unit that has two electrodes (a cathode and an anode). The electrolyte is the chemical substance that reacts with the electrodes and produces the electric current. Types of battery cells include a cylindrical cell, a button or coin cell, a prismatic cell, and a pouch cell.

The total volume of the battery cell is calculated according to the following equation:

$$\text{Total Volume of the Battery Cell} = \text{Volume of Active Materials} + \text{Volume of Inactive Materials} \quad (2)$$

The energy density of a battery (Volumetric Energy) is calculated according to the following equation:

$$\text{Volumetric Energy Density} = \frac{\text{Energy of the Battery Cell}}{\text{Total Volume of the Battery Cell}} \quad (3)$$

The volume ratio (VR) between the active and inactive materials is calculated according to the following equation:

$$\text{Volume Ratio} = \frac{\text{Volume of Active Electrode Materials}}{\text{Volume of Inactive Electrode Materials}} \quad (4)$$

In order to achieve an ideal actual battery performance, the volume ratio (VR) between the active electrode materials (active material layers) and the other battery components (substrate including VACNT forests, separator, foil, packaging) has to be maximized.

A thin film of active materials can be deposited onto the foil current collectors using ALD, CVD, and sputter methods to produce cell electrodes. Film thickness can be several nanometers to a few micrometers. Thicker films are required to achieve high loadings and thus high energy densities but would drastically reduce the rate performance (or power density). Additionally, growing a thick film on a planar substrate by ALD would take a long time and have high manufacturing cost. The deposition time can be shortened by coating a very thin film of active materials on the planar substrate, but then the VR becomes very small and the resulting energy density is low. The electrodes in conventional lithium ion batteries are usually much thicker (between 40 µm and 80 µm) and thus have a higher VR and higher energy density. By using VACNT structures, much higher areal capacity (for the same thickness) can be achieved than conventional electrode, and thus, higher energy density. Also, because the material coating thickness is kept at the nanoscale, and the VACNT provides a much greater active surface area, the resulting electrode also has much higher power density.

The volumetric energy density of a battery cell that include VACNT structures in the anode and cathode may be up to about 1700 Wh/L, alternatively up to about 1600 Wh/L, alternatively between about 500 and about 1600 Wh/L, alternatively between about 600 and about 1600 Wh/L, alternatively between 750 and about 1600 Wh/L, alternatively between about 750 and about 1400 Wh/L. The volumetric energy density of lithium ion batteries with traditional electrode structures are typically between 300 and 900 Wh/L, typically up to about 720 Wh/L. The volumetric energy density may also be as low as 20 Wh/L when constructing the battery for very high power applications (e.g. 10,000 W/L) as may be used in hybrid electric vehicles, alternatively between about 20 Wh/L to about 400 Wh/L, alternatively between about 20 Wh/L to about 300 Wh/L, alternatively between about 10 Wh/L to about 400 Wh/L.

The specific energy density or gravimetric energy density of a battery cell that includes VACNT structures in the anode and cathode may be between about 250 and about 700 Wh/kg, alternatively between about 250 and about 600 Wh/kg, alternatively between about 400 and about 600 Wh/kg, alternatively between about 500 and about 600 Wh/kg, alternatively between about 550 and about 650 Wh/kg, alternatively between about 10 and about 600 Wh/kg, alternatively between about 10 and about 500 Wh/kg, alternatively between about 10 and about 400 Wh/kg, alternatively between about 10 and about 300 Wh/kg, alternatively between about 5 and about 300 Wh/kg. The energy density of lithium ion batteries with traditional electrode structures are typically below 250 Wh/kg.

The total capacity of a battery cell that include VACNT structures in the anode and cathode can be between about 2 and about 15 mAh/cm$^2$, alternatively between about 2 and about 9 mAh/cm$^2$, alternatively between about 2 and about 6 mAh/cm$^2$.

Although the foregoing invention has, for the purposes of clarity and understanding, been described in some detail by way of illustration and example, it will be obvious that certain changes and modifications may be practiced which will still fall within the scope of the appended claims.

What is claimed is:

1. An anode of a lithium ion battery, comprising:
   a substrate, wherein the substrate comprises at least one hole or void, wherein the plurality of vertically aligned carbon nanotubes are not grown in the at least one hole or void, and wherein a perimeter of the at least one hole or void defines an area between 10 and 500 µm$^2$;
   a current collector comprising a plurality of vertically aligned carbon nanotubes in a pattern on the substrate, wherein each nanotube of the plurality of vertically aligned carbon nanotubes has an outer surface and a first end, wherein the first end is coupled to the substrate;
   an active material layer located on the outer surface of each nanotube of the plurality of vertically aligned carbon nanotubes.

2. The anode of claim 1, wherein the first end of each nanotube of the plurality of vertically aligned carbon nanotubes is connected to the substrate and a longitudinal axis of each nanotube is perpendicular to a longitudinal axis of the substrate.

3. The anode of claim 1, wherein the substrate has a first and second side, wherein a first portion of the plurality of vertically aligned carbon nanotubes are connected to the first side of the substrate and a second portion of the plurality of vertically aligned carbon nanotubes are connected to the second side of the substrate.

4. The anode of claim 1, wherein a distance between adjacent voids is between 25 µm and 100 µm.

5. The anode of claim 1, wherein the substrate is a patterned substrate.

6. The anode of claim 5, wherein the patterned substrate is selected from the group consisting of a mesh, a screen, and a foil.

7. The anode of claim 1, wherein an aspect ratio of the plurality of vertically aligned carbon nanotubes is between 100 and 1500.

8. The anode of claim 1, wherein the active material layer comprises silicon.

9. The anode of claim 1, wherein the anode further comprises a second active material layer.

10. The anode of claim 9, wherein the second active material layer is a protective layer.

11. The anode of claim 9, wherein the second active material layer comprises $SnO_x$ or $TiO_2$.

12. The anode of claim 1, wherein the anode further comprises a layer of $Al_2O_3$.

13. The anode of claim 1, wherein the active material layer comprises a material selected from the group consisting of $SnO_2$, $SiO_x$, $RuO_2$, $TiO_2$, $Cu_2S$, and combinations thereof.

14. The anode of claim 1, wherein the outer surface of each nanotube of the plurality of vertically aligned carbon nanotubes is functionalized to increase an amount of precursor nucleation sites.

15. The anode of claim 14, wherein the outer surface is functionalized using a method selected from the group consisting of acid functionalization, oxygen plasma treatment, chemical functionalization, and application of an adhesion layer.

16. The anode of claim 1, wherein the active material layer is deposited on the outer surface of each nanotube in the plurality of vertically aligned carbon nanotubes by atomic layer deposition.

* * * * *